United States Patent
Takenaka et al.

(10) Patent No.: US 8,353,173 B2
(45) Date of Patent: Jan. 15, 2013

(54) REFRIGERATING CYCLE APPARATUS AND OPERATION CONTROL METHOD THEREFOR

(75) Inventors: Naofumi Takenaka, Tokyo (JP); Shinichi Wakamoto, Tokyo (JP); Fumitake Unezaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 679 days.

(21) Appl. No.: 12/600,842

(22) PCT Filed: Jun. 18, 2008

(86) PCT No.: PCT/JP2008/061121
§ 371 (c)(1),
(2), (4) Date: Nov. 19, 2009

(87) PCT Pub. No.: WO2009/011197
PCT Pub. Date: Jan. 22, 2009

(65) Prior Publication Data
US 2010/0152903 A1    Jun. 17, 2010

(30) Foreign Application Priority Data
Jul. 18, 2007 (JP) .................. 2007-186873

(51) Int. Cl.
*F25B 41/04* (2006.01)
*G01K 13/00* (2006.01)
(52) U.S. Cl. ............. 62/225; 62/222; 62/129; 62/228.5

(58) Field of Classification Search .................. 62/225, 62/222, 228.5, 129, 498, 513; 700/275
See application file for complete search history.

(56) References Cited

U.S. PATENT DOCUMENTS
2007/0125106 A1    6/2007   Ishikawa et al.

FOREIGN PATENT DOCUMENTS

| JP | 11 211251 | 8/1999 |
|---|---|---|
| JP | 2001 108314 | 4/2001 |
| JP | 2001 289537 | 10/2001 |
| JP | 2003 97864 | 4/2003 |
| JP | 2004 144351 | 5/2004 |
| JP | 2006 153349 | 6/2006 |
| JP | 2007 139269 | 6/2007 |
| JP | 2008 2706 | 1/2008 |

*Primary Examiner* — Chen Wen Jiang
(74) *Attorney, Agent, or Firm* — Oblon, Spivak, McClelland, Maier & Neustadt, L.L.P.

(57) ABSTRACT

In a refrigerating cycle apparatus and control method thereof, a controller sets a high-pressure pressure target value from thermal load and temperature conditions based on refrigerant information that has been obtained from detectors, and controls at least one of a rotational frequency of a compressor, a degree of opening of an electronic expansion valve, a rotational frequency of an outdoor fan, or a rotational frequency of an indoor fan to match a high-pressure pressure to the high-pressure pressure target value that has been set. Here, a threshold value is set when the high-pressure pressure target value is set, and a method for setting the high-pressure pressure target value is modified depending on whether the high-pressure pressure is greater than or equal to the threshold value or less than the threshold value when the high-pressure pressure target value is decided.

10 Claims, 9 Drawing Sheets

REFRIGERATING CYCLE APPARATUS AND OPERATION CONTROL METHOD THEREFOR

TECHNICAL FIELD

The present invention relates to a refrigerating cycle apparatus such as an air-conditioning device or a heat pump, etc., and to an operation control method therefor, and particularly relates to a refrigerating cycle apparatus that enables energy saving by operating at a high coefficient of performance (COP) in response to fluctuations in thermal load, temperature conditions, etc., in a vapor compression cycle that uses a refrigerant such as carbon dioxide ($CO_2$), for example, for which a high-pressure side operates in a gas-liquid two-phase region or a supercritical region depending on conditions of thermal load (quantity of heat required for cold or heat), temperature, etc., and to an operation control method therefor.

BACKGROUND ART

In recent years, with a view to global environmental protection and improvements in machinery efficiency, investigations have been made into the use of supercritical refrigerants such as carbon dioxide, etc., as air conditioner refrigerants in which a high-pressure side can be operated in a gas-liquid two-phase region or a supercritical region depending on such conditions as thermal load. Examples of air conditioners that use refrigerants that can be operated when high-pressure pressure is greater than or equal to critical pressure include supercritical vapor compression cycle operating methods and operating devices such as that described in Patent Literature 1, for example.

In a supercritical vapor compression cycle operating method such as that described in Patent Literature 1, a supercritical vapor compression cycle apparatus includes a compressor, a high-pressure heat exchanger (radiator), a throttling means, and an evaporator, and characteristics of inflow temperature of fluid that flows into the radiator and exchanges heat with the refrigerant, and a high-side pressure at which a coefficient of performance of the vapor compression cycle is maximized are found in advance. Thus, the inflow temperature of the fluid (an indoor temperature, for example) is measured as a control variable for the vapor compression cycle, and if this measured value has not reached a target value and capacity is required from the vapor compression cycle, a degree of opening of the throttling means is adjusted so as to operate at a high-side pressure at which the coefficient of performance is maximized based on the characteristics of the inflow temperature of the fluid and the high-side pressure that have been found in advance. If, on the other hand, capacity is not required from the vapor compression cycle, the degree of opening of the throttling means is adjusted so as to lower the high-side pressure to a preset minimum high-side pressure and reduce capacity, and if operation at this minimum high-side pressure continues for a preset specific amount of time, the compressor is stopped, and on-off control of the compressor is performed manually.

Patent Literature 1: Japanese Patent Laid-Open No. HEI 11-211251 (Gazette)

DISCLOSURE OF THE INVENTION

Problem to be Solved by the Invention

In a supercritical vapor compression cycle apparatus operating method of this kind, heat transfer characteristics of the fluid that exchanges heat with the refrigerant in the heat exchanger (air, for example) become important. However, the conventional supercritical vapor compression cycle apparatus operating method described above is not control that has taken into account the heat transfer characteristics of the fluid that exchanges heat with the refrigerant of the heat exchanger, and for practical purposes has not been able to cope with fluctuations in thermal load, temperature conditions of the fluid that exchanges heat with the refrigerant, or flow rate of the fluid, etc., that can occur in an apparatus. Consequently, one problem has been that the conventional supercritical vapor compression cycle apparatus operating method described above cannot perform efficient operation despite demands for energy saving, since it cannot perform appropriate control in response to the fluctuations in thermal load, temperature conditions of the fluid, or the flow rate of the fluid, etc., that can occur in practical use.

The present invention aims to solve the above problems and an object of the present invention is to provide a refrigerating cycle apparatus that enables energy saving by using a refrigerant for which a high-pressure side can be operated in a gas-liquid two-phase region or a supercritical region to perform operation in which a high COP is maintained even in response to fluctuations in thermal load and temperature conditions, etc., and to provide an operation control method therefor.

Means for Solving the Problem

In order to achieve the above object, according to one aspect of the present invention, there is provided a refrigerating cycle apparatus including: a refrigerant circuit that is configured by connecting a compressor, a high-pressure heat exchanger, a throttling means, and a low-pressure heat exchanger using liquid piping and gas piping, and through which a refrigerant is cycled; a heated medium conveying means and a cooled medium conveying means that convey a heated medium and a cooled medium relative to the high-pressure heat exchanger and the low-pressure heat exchanger; a detecting means that detects temperature and pressure of the refrigerant in the refrigerant circuit and temperatures of the heated medium and the cooled medium; and a controlling means that sets a high-pressure pressure target value from thermal load and temperature conditions that are based on refrigerant information that has been obtained from the detecting means, and controls at least one of a rotational frequency of the compressor, a degree of opening of the throttling means, a flow rate of the heated medium, or a flow rate of the cooled medium so as to match a high-pressure pressure to the high-pressure pressure target value that has been set. The controlling means is configured such that a threshold value is set when the high-pressure pressure target value is set, and a method for setting the high-pressure pressure target value is modified depending on whether the high-pressure pressure is greater than or equal to the threshold value or less than the threshold value when the high-pressure pressure target value is decided.

EFFECTS OF THE INVENTION

The present invention takes into account the fact that the flow conditions of the refrigerant inside a high-pressure heat exchanger may be single-phase flow (e.g., a superheated gas, a supercooled liquid, or a supercritical fluid) or a gas-liquid two-phase flow, and that the refrigerant temperature and its heat transfer rate change, and changes the method for setting the high-pressure pressure target value depending on whether the high-pressure pressure is greater than or equal to the threshold value or less than the threshold value when the high-pressure pressure target value is set. For example, by comparing the magnitudes of the thermal resistances of the refrigerant and the heated medium inside the high-pressure heat exchanger and setting the high-pressure pressure target value appropriately, operation in a state of high COP can be maintained even if the temperature and the flow rate of the cooled medium at the low-pressure heat exchanger fluctuates and changes the state of the refrigerant at the inlet to the high-pressure heat exchanger.

DETAILED DESCRIPTION OF THE PREFERRED EMBODIMENTS

Preferred embodiments of the present invention will now be explained using drawings.

Embodiment 1

Figure 1:
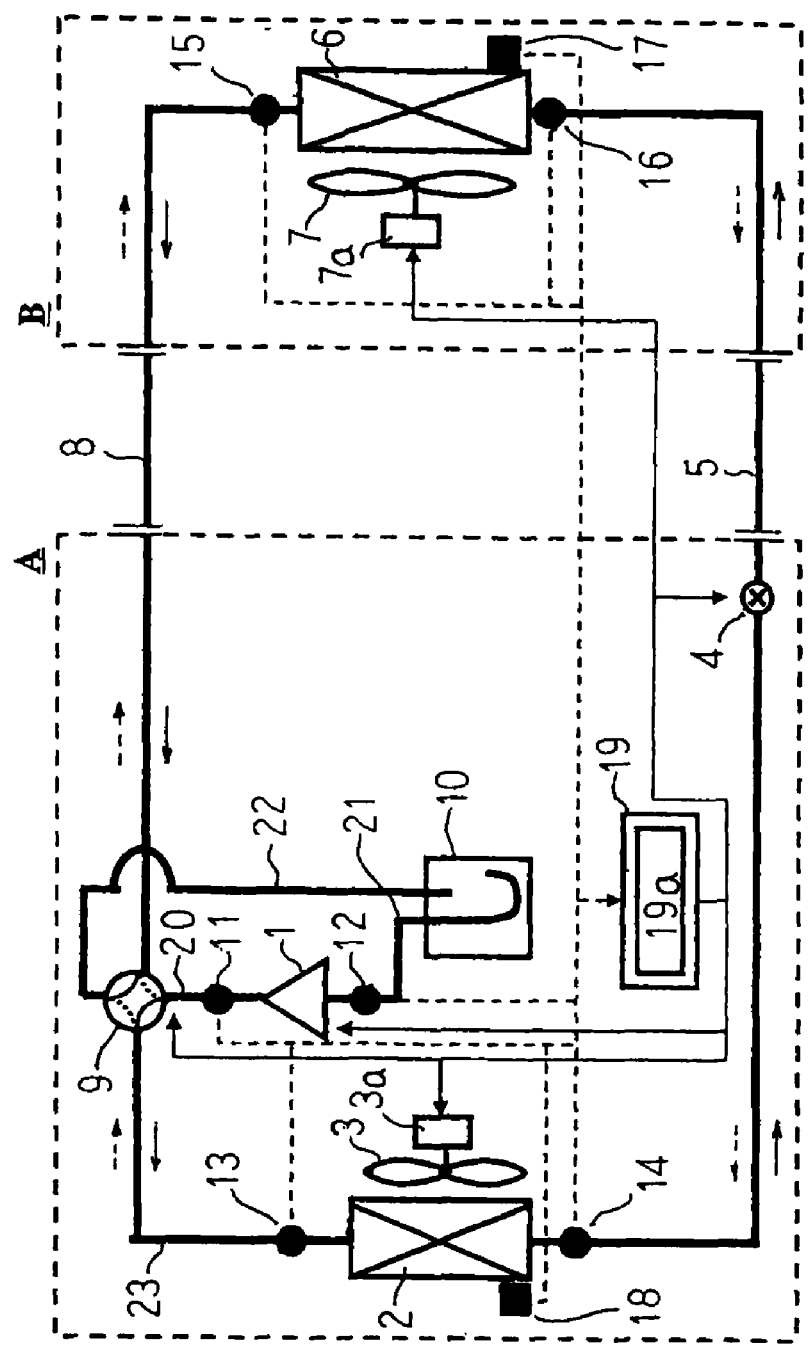
FIG. 1 is a refrigerant circuit diagram for an air conditioner according to Embodiment 1 of the present invention.
Figure 2:
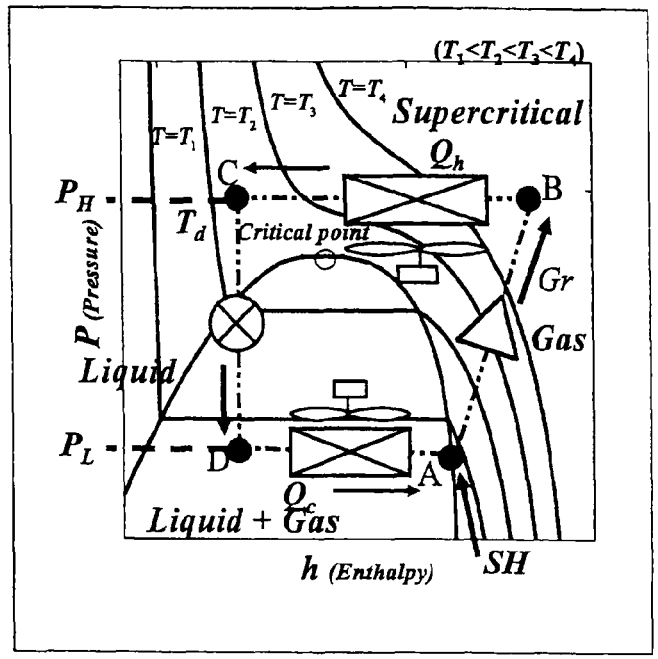
FIG. 2 is a pressure-specific enthalpy chart for a refrigerating cycle of the refrigerant circuit that is shown in FIG. 1.

FIG. 1 is a refrigerant circuit diagram for an air conditioner according to Embodiment 1 of the present invention, and FIG. 2 is a pressure-specific enthalpy chart for a refrigerating cycle of the refrigerant circuit that is shown in FIG. 1.

In FIG. 1, an air conditioner that functions as a refrigerating cycle apparatus uses carbon dioxide as a refrigerant, and includes: an outdoor unit A that has: a compressor 1 for compressing a refrigerant; an outdoor heat exchanger 2; an outdoor fan 3 that introduces outdoor air into the outdoor heat exchanger 2; and an accumulator 10; and an indoor unit B that has a single indoor machine that is constituted by an indoor heat exchanger 6 and an indoor fan 7 that introduces indoor air into the indoor heat exchanger 6.

A first end of compressor discharge piping 20 is connected to a refrigerant discharge outlet of the compressor 1, and a second end is connected to a four-way switching valve 9. A first end of compressor intake piping 21 is connected to a refrigerant intake inlet of the compressor 1, and a second end is connected to an upper portion of the accumulator 10. A first end of an inflow pipe 22 is connected to the four-way switching valve 9, and a second end is connected to an upper portion of the accumulator 10. A first end of the outdoor heat exchanger 2 is connected to the four-way switching valve 9 by means of piping 23. A first end of the indoor heat exchanger 6 is connected to the four-way switching valve 9 by means of gas piping 8 that functions as first connecting piping. A second end of the outdoor heat exchanger 2 and a second end of the indoor heat exchanger 6 are connected by liquid piping 5 that functions as second connecting piping. An electronic expansion valve 4 that functions as a throttling means is disposed on the liquid piping 5 inside the outdoor unit A. Moreover, this electronic expansion valve 4 may also be mounted inside the indoor unit B provided that it is disposed on the liquid piping 5.

The four-way switching valve 9 is configured such that the direction of the refrigerant that flows to the outdoor heat exchanger 2 can be switched so as to correspond to operating modes. During cooling operation, the four-way switching valve 9 connects the gas piping 8 to the accumulator 10 by means of the inflow pipe 22, and connects the refrigerant discharge port of the compressor 1 to the first end of the outdoor heat exchanger 2 by means of the compressor discharge piping 20 and the piping 23. Here, the refrigerant flows from the first end of the outdoor heat exchanger 2 toward the second end. During heating operation, on the other hand, the four-way switching valve 9 connects the first end of the outdoor heat exchanger 2 to the accumulator 10 by means of the piping 23 and the inflow pipe 22, and connects the refrigerant discharge port of the compressor 1 to the first end of the indoor heat exchanger 6 by means of the compressor discharge piping 20 and the gas piping 8. Here, the refrigerant flows from the second end of the outdoor heat exchanger 2 toward the first end.

A discharge pressure detector 11 that detects a discharge pressure of the refrigerant is disposed on the compressor discharge piping 20, and an intake pressure detector 12 that detects an intake pressure of the refrigerant is disposed on the compressor intake piping 21. Refrigerant temperature detectors 13 and 14 are disposed on the piping 23 and the liquid piping 5 in a vicinity of an inlet and an outlet of the heat exchanger 2. Refrigerant temperature detectors 15 and 16 are disposed on the liquid piping 5 and the gas piping 8 in a vicinity of an inlet and an outlet of the indoor heat exchanger 6. Moreover, similar effects can also be achieved if the refrigerant temperature detectors 13 through 16 measure the respective surface temperatures of the piping instead of measuring the temperature of the refrigerant directly. An indoor temperature detector 17 and an outside air temperature detector 18 are respectively disposed in air near the indoor heat exchanger 6 and the outdoor heat exchanger 2, and measure intake temperature, for example, as a representative air temperature.

A controlling means 19 controls driving of the compressor 1, driving of a fan motor 3a of the outdoor fan 3, a degree of opening of the electronic expansion valve 4, driving of a fan motor 7a of the indoor fan 7, and a valve switching operation of the four-way switching valve 9 based on detection signals from the discharge pressure detector 11, the intake pressure detector 12, the refrigerant temperature detectors 13 through 16, the indoor temperature detector 17, and the outside air temperature detector 18. The controlling means 19 includes a memory 19a in which functions that determine thermal load, temperature conditions, and respective control values, etc., that are described below are stored.

Next, operation during cooling operation of an air conditioner that is configured in this manner will be explained. The four-way selector valve 9 is connected as indicated by the solid lines in FIG. 1 such that the compressor discharge piping 20 that is connected to the discharge outlet of the compressor 1 and the piping 23 that is connected to the first end of the outdoor heat exchanger 2 communicate with each other, and the inflow pipe 22 and the gas piping 8 that is connected to the first end of the indoor heat exchanger 6 communicate with each other. Here, the outdoor heat exchanger 2 functions as a radiator, and the indoor heat exchanger 6 functions as an evaporator. The outdoor heat exchanger 2 corresponds to a high-pressure heat exchanger, and the indoor heat exchanger 6 corresponds to a low-pressure heat exchanger. The outdoor air corresponds to a heated medium, and the outdoor fan 3 corresponds to a heated medium conveying means. The indoor air, on the other hand, corresponds to a cooled medium, and the indoor fan 7 corresponds to a cooled medium conveying means.

First, low-temperature, low-pressure refrigerant gas in the accumulator 10 is sucked through the compressor intake piping 21 into the compressor 1, is compressed by the compressor 1, and is discharged as high-temperature, high-pressure refrigerant gas. Here, changes in the refrigerant in the compressor 1 are represented by A to B in the pressure-specific enthalpy chart that is shown in FIG. 2. In other words, the refrigerant is compressed to a high-pressure pressure $P_H$ in the compressor 1.

The high-temperature, high-pressure refrigerant gas that has been introduced into the outdoor heat exchanger 2 exchanges heat with the outdoor air that has been introduced into the outdoor heat exchanger 2 by the outdoor fan 3. The temperature of the carbon dioxide that functions as the refrigerant is reduced as it heats the outdoor air. Here, the changes in the refrigerant in the outdoor heat exchanger 2 are represented by B to C in the pressure-specific enthalpy chart that is shown in FIG. 2. Heat from the refrigerant is radiated to an outlet temperature Td of the outdoor heat exchanger 2.

The medium-temperature, high-pressure refrigerant gas then flows through the liquid piping 5, is decompressed at the electronic expansion valve 4, and becomes a low-temperature, low-pressure refrigerant in a gas-liquid two-phase state. The changes in the refrigerant at the electronic expansion valve 4 are represented by C to D in the pressure-specific enthalpy chart that is shown in FIG. 2, and the refrigerant is decompressed to the low-pressure pressure $P_L$.

The low-temperature, low-pressure refrigerant in the gas-liquid two-phase state flows through the liquid piping 5, and is introduced into the indoor heat exchanger 6. The low-temperature, low-pressure refrigerant in the gas-liquid two-phase state that has been introduced into the indoor heat exchanger 6 exchanges heat with the indoor air that has been introduced into the indoor heat exchanger 6 by the indoor fan 7, and changes to a low-temperature, low-pressure refrigerant vapor while cooling the indoor air. Here, the changes in the refrigerant in the indoor heat exchanger 6 are represented by D to A in the pressure-specific enthalpy chart that is shown in FIG. 2, and the refrigerant absorbs heat from the indoor air and is subjected to superheating SH.

The low-temperature, low-pressure refrigerant vapor then flows through the gas piping 8 and the inflow pipe 22, and is returned to the accumulator 10. The refrigerant that has been returned to the accumulator 10 is separated into gas and liquid, and the low-temperature, low-pressure refrigerant gas is sucked through the compressor intake piping 21 into the compressor 1.

Thus, as indicated by solid arrows in FIG. 1, the refrigerant circulates inside the refrigerant circuit sequentially from the compressor 1 to the compressor discharge piping 20 to the four-way switching valve 9 to the piping 23 to the outdoor heat exchanger 2 to the liquid piping 5 to the electronic expansion valve 4 to the indoor heat exchanger 6 to the gas piping 8 to the four-way switching valve 9 to the inflow pipe 22 to the accumulator 10 to the compressor intake piping 21 to the compressor 1 to perform the cooling operation.

Next, operation during heating operation will be explained. The four-way selector valve 9 is connected as indicated by the dotted lines in FIG. 1 such that the compressor discharge piping 20 that is connected to the discharge outlet of the compressor 1 and the gas piping 8 that is connected to the first end of the indoor heat exchanger 6 communicate with each other, and the inflow pipe 22 and the piping 23 that is connected to the first end of the outdoor heat exchanger 2 communicate with each other. Here, the outdoor heat exchanger 2 functions as an evaporator, and the indoor heat exchanger 6 functions as a radiator. The outdoor heat exchanger 2 corresponds to a low-pressure heat exchanger, and the indoor heat exchanger 6 corresponds to a high-pressure heat exchanger. The outdoor air corresponds to a cooled medium, and the outdoor fan 3 corresponds to a cooled medium conveying means. The indoor air, on the other hand, corresponds to a heated medium, and the indoor fan 7 corresponds to a heated medium conveying means.

First, low-temperature, low-pressure refrigerant gas in the accumulator 10 is sucked through the compressor intake piping 21 into the compressor 1, is compressed by the compressor 1, and is discharged as high-temperature, high-pressure refrigerant gas. Here, changes in the refrigerant in the compressor 1 are represented by A to B in the pressure-specific enthalpy chart that is shown in FIG. 2. In other words, the refrigerant is compressed to a high-pressure pressure $P_H$ in the compressor 1.

The high-temperature, high-pressure refrigerant gas that has been introduced through the gas piping 8 into the indoor heat exchanger 6 exchanges heat with the indoor air that has been introduced into the indoor heat exchanger 6 by the indoor fan 7, reducing its temperature as it heats the indoor air. Here, the changes in the refrigerant in the indoor heat exchanger 6 are represented by B to C in the pressure-specific enthalpy chart that is shown in FIG. 2, heat from the refrigerant being radiated to an outlet temperature Td of the indoor heat exchanger 6.

The medium-temperature, high-pressure refrigerant gas then flows through the liquid piping 5, is decompressed at the electronic expansion valve 4, and becomes a low-temperature, low-pressure refrigerant in a gas-liquid two-phase state. The changes in the refrigerant at the electronic expansion valve 4 are represented by C to D in the pressure-specific enthalpy chart that is shown in FIG. 2, and the refrigerant is decompressed to the low-pressure pressure $P_L$.

The low-temperature, low-pressure refrigerant in the gas-liquid two-phase state flows through the liquid piping 5, and is introduced into the outdoor heat exchanger 2. The low-temperature, low-pressure refrigerant in the gas-liquid two-phase state that has been introduced into the outdoor heat exchanger 2 exchanges heat with the outdoor air that has been introduced into the outdoor heat exchanger 2 by the outdoor fan 3, and changes to a low-temperature, low-pressure refrigerant vapor while cooling the outdoor air. Here, the changes in the refrigerant in the outdoor heat exchanger 2 are represented by D to A in the pressure-specific enthalpy chart that is shown in FIG. 2, and the refrigerant absorbs heat from the outdoor air. The low-temperature, low-pressure refrigerant vapor then flows through the piping 23 and the inflow pipe 22, and is returned to the accumulator 10. The refrigerant that has been returned to the accumulator 10 is separated into gas and liquid, and the low-temperature, low-pressure refrigerant gas is sucked through the compressor intake piping 21 into the compressor 1. Moreover, if the high-pressure pressure $P_H$ is less than or equal to a critical pressure, the temperature at point C in FIG. 2 will be lower than a condensing temperature $T_c$ of the refrigerant at the pressure in question ($T_d < T_c$), leading to supercooling SC ($= T_c - T_d$).

Thus, as indicated by broken arrows in FIG. 1, the refrigerant circulates inside the refrigerant circuit sequentially from the compressor 1 to the compressor discharge piping 20 to the four-way switching valve 9 to the gas piping 8 to the indoor heat exchanger 6 to the liquid piping 5 to the electronic expansion valve 4 to the outdoor heat exchanger 2 to the piping 23 to the four-way switching valve 9 to the inflow pipe 22 to the accumulator 10 to the compressor intake piping 21 to the compressor 1 to perform the heating operation.

Figure 3:
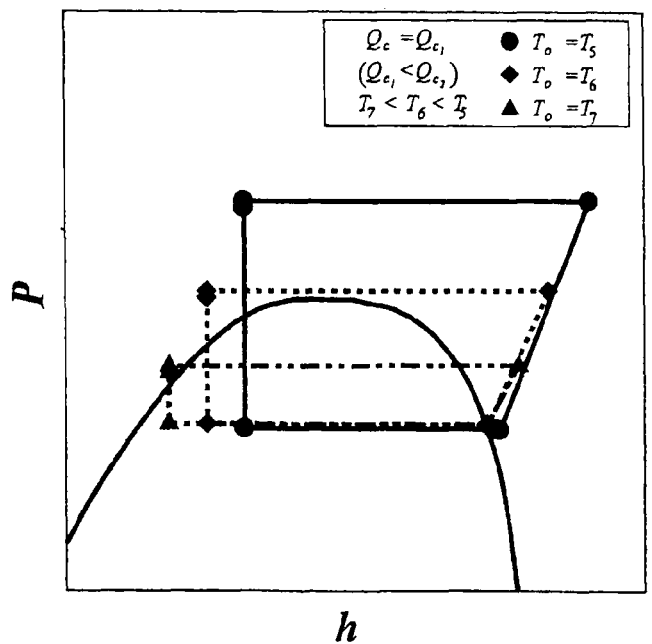
FIG. 3 is a pressure-specific enthalpy chart for the refrigerating cycle of the refrigerant circuit that is shown in FIG. 1 when ambient temperature fluctuates during light-load cooling operation.
Figure 4:
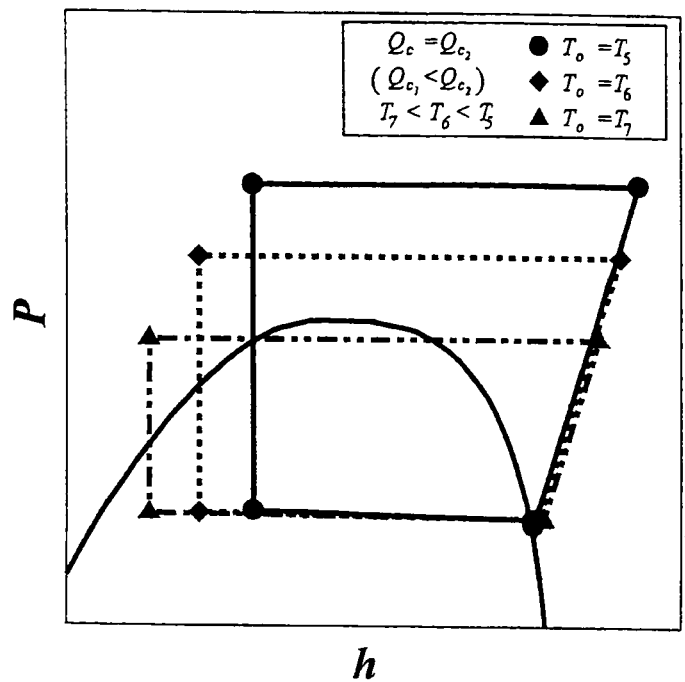
FIG. 4 is a pressure-specific enthalpy chart for the refrigerating cycle of the refrigerant circuit that is shown in FIG. 1 when ambient temperature fluctuates during heavy-load cooling operation.
Figure 5:
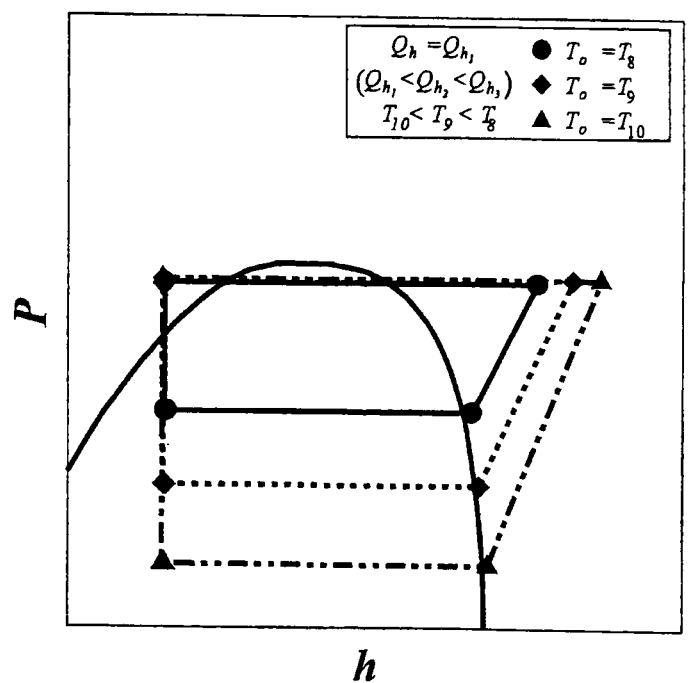
FIG. 5 is a pressure-specific enthalpy chart for the refrigerating cycle of the refrigerant circuit that is shown in FIG. 1 when ambient temperature fluctuates during light-load heating operation.
Figure 6:
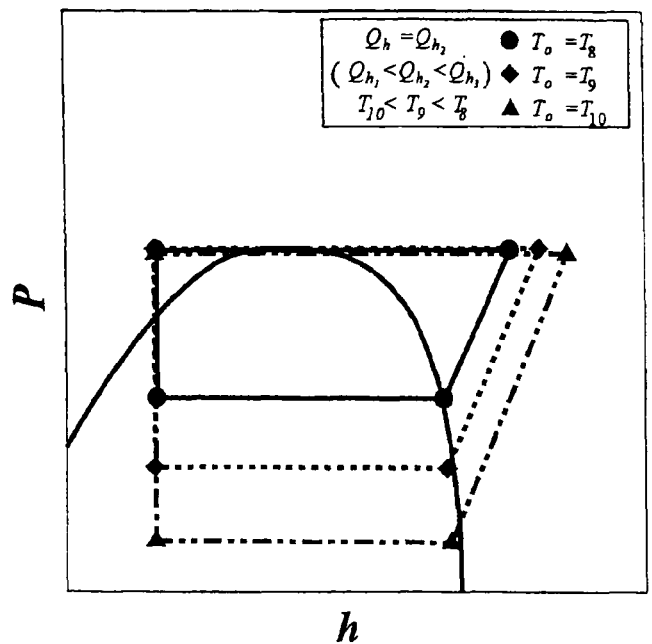
FIG. 6 is a pressure-specific enthalpy chart for the refrigerating cycle of the refrigerant circuit that is shown in FIG. 1 when ambient temperature fluctuates during medium-load heating operation.
Figure 7:
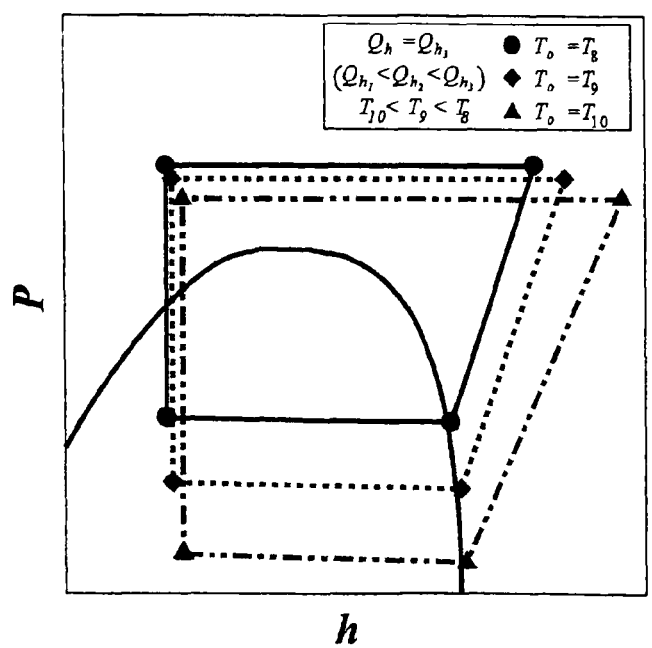
FIG. 7 is a pressure-specific enthalpy chart for the refrigerating cycle of the refrigerant circuit that is shown in FIG. 1 when ambient temperature fluctuates during heavy-load heating operation.

Next, target cycles for operating in a state of high COP during cooling operation and during heating operation are shown in FIGS. 3 through 7. Here, FIGS. 3 and 4 show target cycles when cooling load $Q_c^*$ and outside air temperature $T_o$ fluctuate during cooling operation, and FIGS. 5 through 7 show target cycles when heating load $Q_h^*$ and outside air temperature $T_o$ fluctuate during heating operation. Moreover, since the set temperature of the indoor temperature does not normally vary greatly, indoor temperature $T_i$ is assumed to be constant.

As can be seen from FIGS. 3 and 4, during cooling operation, the high-pressure pressure $P_H$, which is the pressure on the outdoor heat exchanger 2 side, changes greatly with fluctuations in cooling load $Q_c^*$ and outside air temperature $T_o$. On the other hand, the low-pressure pressure $P_L$, which is the pressure on the indoor heat exchanger 6 side, changes only due to cooling load $Q_c^*$.

As can be seen from FIGS. 5 through 7, during heating operation, the low-pressure pressure $P_L$, which is the pressure on the outdoor heat exchanger 2 side, changes greatly with fluctuations in heating load $Q_h^*$ and outside air temperature $T_o$. On the other hand, the high-pressure pressure $P_H$, which is the pressure on the indoor heat exchanger 6 side, changes only due to heating load $Q_h^*$ if the heating load $Q_h^*$ is small and does not exceed a critical pressure, and changes due to heating load $Q_h^*$ and outside air temperature $T_o$ if the heating load $Q_h^*$ is great and the critical pressure is exceeded.

If, for example, the refrigerating cycle is controlled using a conventional air heat exchanger that has carbon dioxide as the refrigerant, if the indoor temperature $T_i$ is 27 degrees Celsius during cooling operation, then under conditions in which the outside air temperature $T_o$ is greater than or equal to 10 degrees Celsius and less than or equal to 35 degrees Celsius, and the cooling load satisfies $0.25 \leq Q_c^*/Q_c^*(\text{rated}) \leq 1$, a high-pressure pressure target value $P_H^*$, a low-pressure pressure target value $P_L^*$, and a superheating target value SH* should be set so as to satisfy Formulae 1 through 3.

[Mathematical Formula 1]

$$P_H^* = 1.806\left(\frac{Q_c^*}{Q_{c(\text{rated})}^*}\right) + 0.078\left(\frac{Q_c^*}{Q_{c(\text{rated})}^*}\right)T_o + 0.127T_o + 5.734 \quad [\text{MPa}] \quad (1)$$

[Mathematical Formula 2]

$$P_L^* = -1.958\left(\frac{Q_c^*}{Q_{c(\text{rated})}^*}\right) + 6.021 \quad [\text{MPa}] \quad (2)$$

[Mathematical Formula 3]

$$SH^* = 1° \text{ C.} \quad (3)$$

If the indoor temperature $T_i$ is 20 degrees Celsius during heating operation, then under conditions in which the outside air temperature $T_o$ is greater than or equal to −8 degrees Celsius and less than or equal to 17 degrees Celsius, and the heating load satisfies $0.25 \leq Q_h^*/Q_h^*(\text{rated}) \leq 1$, a high-pressure pressure target value $P_H^*$ and a dew point target value $T_d$ should be set so as to satisfy Formulae 4 and 5 if the high-pressure pressure $P_H$ is greater than or equal to the critical pressure.

[Mathematical Formula 4]

$$P_H^* = 3.848\left(\frac{Q_h^*}{Q_{h(\text{rated})}^*}\right) + 0.088\left(\frac{Q_h^*}{Q_{h(\text{rated})}^*}\right)T_o + 0.035T_o + 5.708 \quad [\text{MPa}] \quad (4)$$

[Mathematical Formula 5]

$$T_d^* = 4.720\left(\frac{Q_h^*}{Q_{h(\text{rated})}^*}\right)^2 + 2.538\left(\frac{Q_h^*}{Q_{h(\text{rated})}^*}\right) + 20.416 \quad [°\text{C}] \quad (5)$$

If the high-pressure pressure $P_H$ is less than the critical pressure under similar conditions, a high-pressure pressure target value $P_H^*$, a low-pressure pressure target value $P_L^*$, and a supercooling target value SC* should be set to so as to satisfy Formulae 6 through 8.

[Mathematical Formula 6]

$$P_H^* = 2.815\left(\frac{Q_h^*}{Q_{h(\text{rated})}^*}\right) + 6.251 \quad [\text{MPa}] \quad (6)$$

[Mathematical Formula 7]

$$SC^* = 7° \text{ C.} \quad (7)$$

[Mathematical Formula 8]

$$P_L^* = -0.431\left(\frac{Q_h^*}{Q_{h(\text{rated})}^*}\right) - 0.017\left(\frac{Q_h^*}{Q_{h(\text{rated})}^*}\right) \quad (8)$$
$$T_o + 0.097T_o + 3.300 \quad [\text{MPa}]$$

Moreover, since performances and sizes of the heat exchangers greatly affect each of the target values, it is necessary to modify each of the above settable coefficients according to what systems are combined. An operation control method that changes setting methods for the high-pressure pressure target value is also effective in the case of other refrigerants, not only $CO_2$ refrigerant, and if the inflow temperature of the fluid that exchanges heat with the refrigerant in the high-pressure heat exchanger is in a vicinity of a critical temperature, the setting method for a control target value should be modified by the critical pressure.

Reasons for modifying the setting methods when the thermal load (the cooling load $Q_c^*$ or the heating load $Q_h^*$) and temperature conditions fluctuate by setting threshold values in the setting methods for pressure target values will now be explained. The outdoor heat exchanger 2 during cooling and the indoor heat exchanger 6 during heating correspond to B to C in the pressure-specific enthalpy chart in FIG. 2, and the outdoor heat exchanger 2 during heating and the indoor heat exchanger 6 during cooling correspond to D to A in the pressure-specific enthalpy chart in FIG. 2. Heat exchanging capacity Q (in kW) is expressed by Formulae 9 and 10.

[Mathematical Formula 9]

$$Q = Gr \times \Delta h \qquad (9)$$

[Mathematical Formula 10]

$$Q = \int \alpha \cdot \Delta T dA = A \overline{\alpha \cdot \Delta T} \qquad (10)$$

Here, Gr is a refrigerant mass flow rate (kg/s), $\Delta h$ is a heat exchanger inlet-outlet specific enthalpy difference (kJ/kg), $\alpha$ is a refrigerant-indoor air overall heat transfer coefficient ($kW/(m^2 K)$), A is heat transfer area ($m^2$), and $\Delta T$ is a refrigerant-indoor air temperature difference (K).

Thus, heat exchanging capacity Q can be determined from Formulae 9 and 10 using the refrigerant mass flow rate Gr, the refrigerant temperature (the refrigerant pressure), the air flow rate, and the indoor air temperature. In order to accomplish heat exchanging capacity Q required by given temperature conditions (the indoor temperature $T_i$ and the outside air temperature $T_o$), it is necessary to adjust $\Delta T$ and $\Delta h$ by adjusting the refrigerant mass flow rate Gr or by adjusting the refrigerant pressure and the refrigerant temperature in the heat exchangers by a cycle controlling means such as the throttling means, etc.

Next, the reason that the low-pressure pressure target value $P_L^*$ changes depending only on the cooling load $Q_c^*$ during cooling operation when the cooling load $Q_c^*$ and the outside air temperature $T_o$ have fluctuated will be explained using FIGS. 2 through 4.

As shown by D to A in FIG. 2, the refrigerant flows into the indoor heat exchanger 6 as a gas-liquid two-phase flow during cooling operation. Since the refrigerant is a gas-liquid two-phase flow, the heat transfer rate of the refrigerant is greater than the heat transfer rate of the air. In other words, the thermal resistance of the air is dominant in the indoor heat exchanger 6. Now, if the outside air temperature $T_o$ becomes high, the specific enthalpy of point C in FIG. 2 can no longer be reduced, and as shown in FIGS. 3 and 4, the specific enthalpy that flows into the indoor heat exchanger 6 rises. Because of this, the inlet-outlet specific enthalpy difference $\Delta h$ of the indoor heat exchanger 6 is reduced. In order to ensure the required heat exchanging capacity Q, it is necessary to increase $\Delta h$ by increasing the refrigerant mass flow rate Gr or by reducing the low-pressure pressure $P_L$ to improve heat transfer characteristics. However, if $\Delta h$ is increased by reducing the low-pressure pressure $P_L$, superheating SH of the refrigerant is increased, and heat transfer characteristics of the refrigerant decrease greatly due to expansion of a region that overheated gas occupies inside the piping of the heat exchanger, making efficiency poor. Consequently, increasing the refrigerant mass flow rate Gr is more efficient. Since the thermal resistance of the air in the heat exchanger is greater than the thermal resistance of the refrigerant, increasing the heat transfer rate of the refrigerant by adjusting the refrigerant mass flow rate Gr also does not greatly affect the overall refrigerant-indoor air heat transfer rate $\alpha$. Consequently, the heat exchanging capacity Q of the indoor heat exchanger 6 during cooling operation is approximately proportional to the temperature difference $\Delta T$ between the indoor air and the refrigerant temperature. In other words, the low-pressure pressure target value $P_L^*$ is not affected even if the outside air temperature $T_o$ fluctuates.

Next, the reason that the high-pressure pressure target value $P_H^*$ changes depending only on the heating load $Q_h^*$ if the heating load $Q_h^*$ during heating operation is small and the high-pressure pressure $P_H$ does not exceed the critical pressure when the heating load $Q_h^*$ and the outside air temperature $T_o$ have fluctuated will be explained using FIGS. 2 and 5.

If the heating load $Q_h^*$ is small during heating operation, the high-low pressure difference of the cycle can be reduced at the same time as the refrigerant mass flow rate Gr is reduced since the temperature difference between the air and the refrigerant also does not need to be great, making the high-pressure pressure target value $P_H^*$ less than or equal to the critical pressure. In such cases, since the refrigerant mass flow rate Gr is small, the heat transfer rate of the refrigerant is approximately equal to the heat transfer rate of the air, particularly in the gaseous single-phase region and the liquid single-phase region.

Now, if the outside air temperature $T_o$ fluctuates, the low-pressure pressure target value $P_L^*$ also changes in order to absorb a predetermined quantity of heat from the outdoor air in the outdoor heat exchanger 2, and the temperature of the refrigerant that flows into the indoor heat exchanger 6 is greater and specific enthalpy increases more if the outside air temperature $T_o$ is low and the low-pressure pressure $P_L$ is low than if the outside air temperature $T_o$ is high and the low-pressure pressure $P_L$ is high. In other words, in order to ensure heating capacity when the outside air temperature $T_o$ is high, it is necessary to increase the high-pressure pressure $P_H$, increase $\Delta T$, and increase $\Delta h$, or to increase the refrigerant mass flow rate Gr. However, if the refrigerant mass flow rate Gr is increased in this case, the temperature and specific enthalpy of the refrigerant that flows into the indoor heat exchanger 6 decreases and the overall temperature difference $\Delta T$ between the refrigerant and the air decreases, but since the heat transfer rate of the refrigerant is approximately equal to the heat transfer rate of the air, and $\alpha$ is also improved by the increase in the refrigerant mass flow rate Gr, capacity can be accomplished efficiently without having to adjust the high-pressure pressure target value $P_H^*$, as shown in FIG. 5. In other words, it is not necessary to change the high-pressure pressure target value $P_H^*$ due to the outside air temperature $T_o$.

In addition, the reason that the high-pressure pressure target value $P_H^*$ changes depending the heating load $Q_h^*$ and the outside air temperature $T_o$ if the heating load $Q_h^*$ during heating operation is large and the high-pressure pressure $P_H$ exceeds the critical pressure when the heating load $Q_h^*$ and the outside air temperature $T_o$ have fluctuated will be explained using FIGS. 2 and 7.

In a similar manner to when the heating load $Q_h^*$ is small, if the outside air temperature $T_o$ increases, the temperature of the refrigerant that flows in is lower, and specific enthalpy is reduced. Unlike when the heating load $Q_h^*$ is small, however, the thermal resistance of the refrigerant is small since the refrigerant mass flow rate Gr is large, and the thermal resistance of the air in the heat exchanger is greater than that of the refrigerant. Consequently, if the outside air temperature $T_o$ increases, although $\Delta T$ decreases since the refrigerant temperature that flows into the high-pressure heat exchanger is reduced, a does not change very much even if the flow rate is increased. As a result, efficient operation can be performed while ensuring capacity by increasing $\Delta T$, in other words, by increasing the high-pressure pressure $P_H$ as shown in FIG. 7.

Thus, operation can be performed in a state of high COP using the operation control method mentioned above even if the cooling load $Q_c*$ or the heating load $Q_h*$ or the outside air temperature $T_o$ change.

Figure 8:
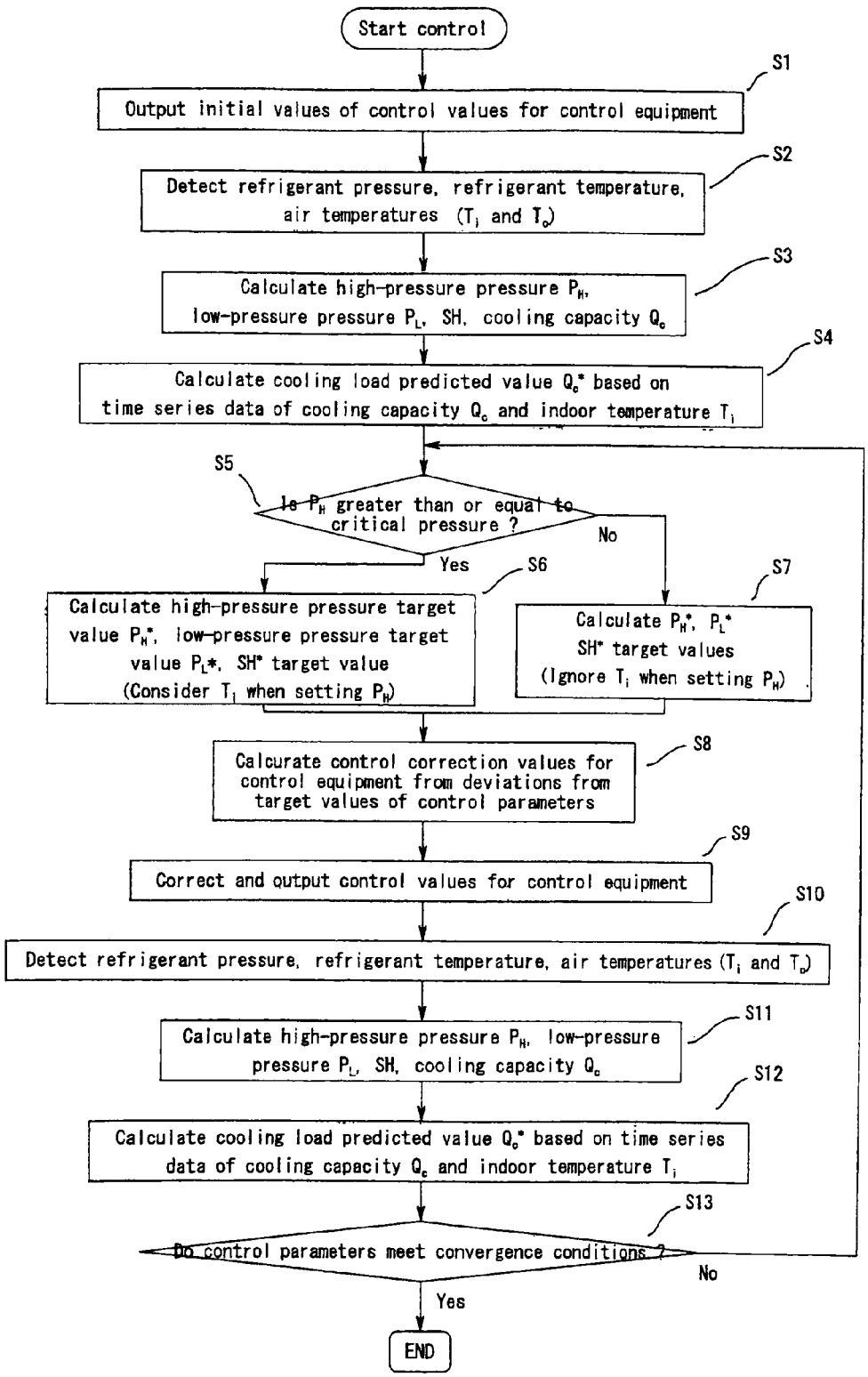
FIG. 8 is a flowchart of operation control during cooling operation in the air conditioner according to Embodiment 1 of the present invention.
Figure 9:
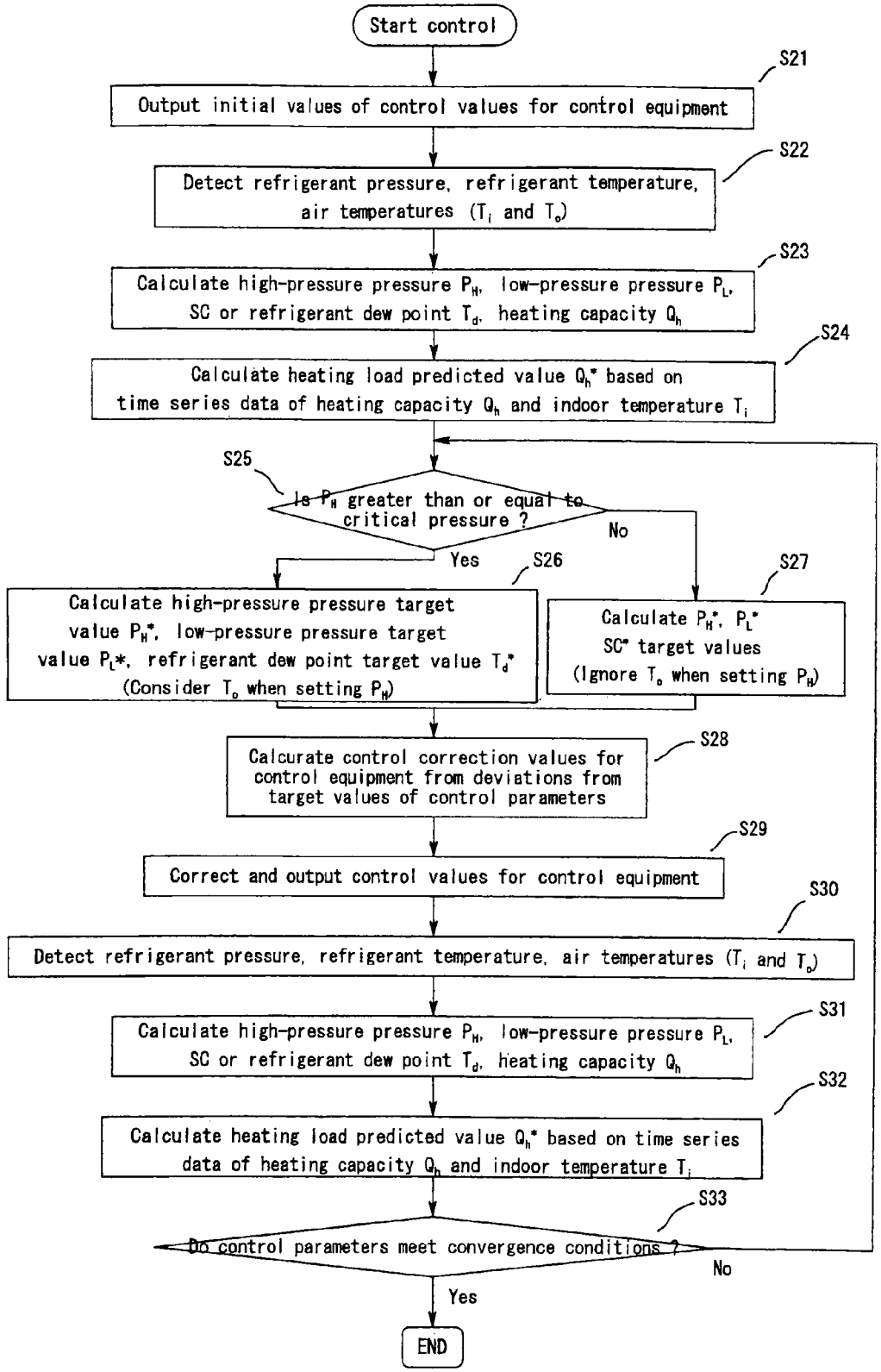
FIG. 9 is a flowchart of operation control during heating operation in the air conditioner according to Embodiment 1 of the present invention.

Next, the refrigerating cycle operation control method used by the controlling means 19 will be explained. FIG. 8 is a flowchart of an operation control method during cooling operation, and FIG. 9 is a flowchart of an operation control method during heating operation. Moreover, Steps 1 through 13 are designated S1 through S13 in FIG. 8, and Steps 21 through 33 are designated S21 through S33 in FIG. 9.

First, the refrigerating cycle operation control method during cooling operation will be explained with reference to the flowchart that is shown in FIG. 8. In this operation control method, operation is performed in a state of high COP by setting target values $P_L*$, $P_H*$, and $SH*$ for respective control parameters, i.e., the low-pressure pressure $P_L$, the high-pressure pressure $P_H$, and the superheating SH of the refrigerant at the outlet of the indoor heat exchanger 6, so as to match the thermal load and the temperature conditions, and adjusting the rotational frequency of the compressor 1, the degree of opening of the electronic expansion valve 4, the rotational frequency of the outdoor fan 3, and the rotational frequency of the indoor fan 7 to perform control that makes the control parameters approach the control target values.

At Step 1, output initial values for the control equipment, then proceed to Step 2 and input the detection signals from the discharge pressure detector 11, the intake pressure detector 12, the refrigerant temperature detectors 13 through 16, the indoor temperature detector 17, and the outside air temperature detector 18. Next, proceed to Step 3 and calculate the low-pressure pressure $P_L$, the high-pressure pressure $P_H$, and the superheating SH of the refrigerant at the outlet of the indoor heat exchanger 6, and calculate the current cooling capacity $Q_c$ based on the refrigerant mass flow rate Gr, which can be found from the specific enthalpy difference of the refrigerant at the inlet and outlet of the indoor heat exchanger 6 and the rotational frequency of the compressor 1.

Next, proceed to Step 4 and estimate the cooling load $Q_c*$ using a correlation between the cooling capacity $Q_c$ and the indoor temperature $T_i$ based on time series data for the cooling capacity $Q_c$ that can be estimated from the quantities of state of the refrigerant in the cycle and time series data for the indoor temperature $T_i$ based on measured data from the indoor temperature detector 17, which is installed in an air intake port of the indoor heat exchanger 6.

Next, proceed to Step 5 where the controlling means 19 performs a decision as to whether the high-pressure pressure $P_H$ has exceeded the critical pressure. If the high-pressure pressure $P_H$ has exceeded the critical pressure, then proceed to Step 6, or if the high-pressure pressure $P_H$ has not exceeded the critical pressure, then proceed to Step 7, and perform modifications to the control target values based on functions that determine the thermal load, the temperature conditions, and the respective control values for the control equipment that are currently held in the memory 19$a$, as follows:

(1) If the high-pressure pressure $P_H$ is less than the critical pressure (Step 7)

$$P_H* = f_1(T_o, Q_c*)$$

$$P_L* = f_2(T_i, Q_c*)$$

$$SH* = f_3(T_i, T_o, Q_c*)$$

(2) If the high-pressure pressure $P_H$ is greater than or equal to the critical pressure (Step 6)

$$P_H* = f_1(T_i, T_o, Q_c*)$$

$$P_L* = f_2(T_i, Q_c*)$$

$$SH* = f_3(T_i, T_o, Q_c*)$$

Next, proceed to Step 8 and calculate amounts of modification to the control values for the control equipment (an amount of modification $\Delta f$ to the rotational frequency of the compressor 1, an amount of modification $\Delta F_o$ to the rotational frequency of the outdoor fan 3, an amount of modification $\Delta C_v$ to the degree of opening of the electronic expansion valve 4, and an amount of modification $\Delta F_i$ to the rotational frequency of the indoor fan 7) using proportional control based on the deviations of the target values and the current values of the respective control parameters as shown below.

$$\Delta f = f_4(P_L - P_L*)$$

$$\Delta F_o = f_5(P_H - P_H*)$$

$$\Delta C_v = f_6(SH - SH*)$$

$$\Delta F_i = f_7(Q_c - Q_c*)$$

Moreover, the relationships between the amounts of modification to the control values for the control equipment and the control parameters described above are representative examples and it is also possible to modify combinations of control parameters and control equipment such as controlling the low-pressure pressure $P_L$ by controlling the degree of opening $\Delta C_v$ of the electronic expansion valve 4, etc., for example.

Next, proceed to Step 9 where the controlling means 19 outputs new control values based on the calculated amounts of modification, and in Steps 10 through 12, measure the respective temperature and pressure data using the measuring instruments inside the refrigerating cycle apparatus, and calculate the low-pressure pressure $P_L$, the high-pressure pressure $P_H$, the superheating SH of the refrigerant at the outlet of the indoor heat exchanger 6, the current cooling capacity $Q_c$, and the estimated value of the cooling load $Q_c*$, in a similar manner to Steps 2 through 4.

Next, proceed to Step 13 and ascertain whether errors from the target values of the respective control parameters are within set error ranges ($\epsilon_1$, $\epsilon_2$, $\epsilon_3$, and $\epsilon_4$).

$$|P_L - P_L*| < \epsilon_1$$

$$|P_H - P_H*| < \epsilon_2$$

$$|SH - SH*| < \epsilon_3$$

$$|Q_c - Q_c*| < \epsilon_4$$

If the errors from the target values of the respective control parameters are not within the set error ranges, return to Step 5. Continue the control from Step 5 through Step 13 until all of these control parameters fall within the error ranges.

Moreover, in Step 6, the high-pressure pressure target value $P_H*$ is assumed to be calculated based on the cooling load $Q_c^*$, the outside air temperature (the heated medium) $T_o$, and the indoor temperature (the cooled medium) $T_i$. However, since the inflow temperature of the refrigerant into the outdoor heat exchanger (the high-pressure heat exchanger) 2 or the specific enthalpy of the refrigerant at the inlet to the outdoor heat exchanger 2 is integrally determined by the indoor temperature $T_i$ and the rotational frequency $F_i$ of the indoor fan 7, the inflow temperature of the refrigerant into the outdoor heat exchanger 2 or the specific enthalpy of the refrigerant at the inlet to the outdoor heat exchanger 2 may also be used instead of the indoor temperature $T_i$.

Next, the refrigerating cycle operation control method during heating operation will be explained with reference to the flowchart that is shown in FIG. 9. In this operation control method, operation is performed in a state of high COP by setting target values $P_L^*$, $P_H^*$, $T_d^*$, and SC* for respective control parameters, i.e., the low-pressure pressure $P_L$, the high-pressure pressure $P_H$, and the dew point $T_d$ and supercooling SC of the refrigerant at the outlet of the indoor heat exchanger 6, so as to match the thermal load and the temperature conditions, and adjusting the rotational frequency of the compressor 1, the degree of opening of the electronic expansion valve 4, the rotational frequency of the outdoor fan 3, and the rotational frequency of the indoor fan 7, etc., to perform control that makes the control parameters approach the control target values.

At Step 21, output initial values for the control equipment, then proceed to Step 22 and input the detection signals from the discharge pressure detector 11, the intake pressure detector 12, the refrigerant temperature detectors 13 through 16, the indoor temperature detector 17, and the outside air temperature detector 18, which constitute measuring instruments inside the refrigerating cycle apparatus. Next, proceed to Step 23 and calculate the low-pressure pressure $P_L$, the high-pressure pressure $P_H$, and the dew point $T_d$ and supercooling SC of the refrigerant at the outlet of the indoor heat exchanger 6, and calculate the current heating capacity $Q_h$ using the refrigerant mass flow rate Gr, which can be found from the specific enthalpy difference of the refrigerant at the inlet and outlet of the indoor heat exchanger 6 and the rotational frequency of the compressor 1.

Next, proceed to Step 24 and estimate the heating load $Q_h^*$ using a correlation between the heating capacity $Q_h$ and the indoor temperature $T_i$ based on time series data for the heating capacity $Q_h$ that can be estimated from the quantities of state of the refrigerant in the cycle and time series data for the indoor temperature $T_i$ based on measured data from the indoor temperature detector 17, which is installed in an air intake port of the indoor heat exchanger 6.

Next, proceed to Step 25 where the controlling means 19 performs a decision as to whether the high-pressure pressure $P_H$ has exceeded the critical pressure. If the high-pressure pressure $P_H$ has exceeded the critical pressure, then proceed to Step 26, or if the high-pressure pressure $P_H$ has not exceeded the critical pressure, then proceed to Step 27, and perform modifications to the control target values based on functions that determine the thermal load, the temperature conditions, and the respective control values for the control equipment that are currently held in the memory 19a, as follows:

(1) If the high-pressure pressure $P_H$ is less than the critical pressure (Step 27)

$$P_H^* = f_1(T_i, Q_h^*)$$

$$P_L^* = f_2(T_o, Q_h^*)$$

$$SC^* = f_3(T_i, T_o, Q_h^*)$$

(2) If the high-pressure pressure $P_H$ is greater than or equal to the critical pressure (Step 26)

$$P_H^* = f_1(T_i, T_o, Q_h^*)$$

$$P_L^* = f_2(T_o, Q_h^*)$$

$$T_d^* = f_3(T_i, T_o, Q_h^*)$$

Next, proceed to Step 28 and calculate amounts of modification to the control values for the control equipment (an amount of modification $\Delta f$ to the rotational frequency of the compressor 1, an amount of modification $\Delta F_o$ to the rotational frequency of the outdoor fan 3, an amount of modification $\Delta C_v$ to the degree of opening of the electronic expansion valve 4, and an amount of modification $\Delta F_i$ to the rotational frequency of the indoor fan 7) using proportional control based on the deviations of the target values and the current values of the respective control parameters as shown below.

$$\Delta f = f_4(P_H - P_H^*)$$

$$\Delta F_o = f_5(P_L - P_L^*)$$

$$\Delta C_v = f_6(SC - SC^*) \text{ (if less than the critical pressure)}$$

$$\Delta C_v = f_6(T_d - T_d^*) \text{ (if greater than or equal to the critical pressure)}$$

$$\Delta F_i = f_7(Q_h - Q_h^*)$$

Next, proceed to Step 29 where the controlling means 19 outputs new control values based on the calculated amounts of modification, and in Steps 30 through 32, measure the respective temperature and pressure data using the measuring instruments inside the refrigerating cycle apparatus, and calculate the low-pressure pressure $P_L$, the high-pressure pressure $P_H$, the conditions (dew point $T_d$ and supercooling SC) at the outlet of the indoor heat exchanger 6, the current heating capacity $Q_h$, and the estimated value of the heating load $Q_h^*$, in a similar manner to Steps 22 through 24.

Next, proceed to Step 33 and ascertain whether errors from the target values of the respective control parameters are within set error ranges ($\epsilon_1$, $\epsilon_2$, $\epsilon_3$, and $\epsilon_4$).

$$|P_L - P_L^*| < \epsilon_1$$

$$|P_H - P_H^*| < \epsilon_2$$

$$|SC - SC^*| < \epsilon_3 \text{ (if less than the critical pressure)}$$

$$|T_d - T_d^*| < \epsilon_3 \text{ (if greater than or equal to the critical pressure)}$$

$$|Q_h - Q_h^*| < \epsilon_4$$

If the errors from the target values of the respective control parameters are not within the set error ranges, return to Step 25. Continue the control from Step 25 through Step 33 until all of these control parameters fall within the error ranges.

Moreover, in Step 26, the high-pressure pressure target value $P_H^*$ is assumed to be calculated based on the thermal load $Q_h^*$, the outside air temperature (the heated medium) $T_o$, and the indoor temperature (the cooled medium) $T_i$. However, since the inflow temperature of the refrigerant into the indoor heat exchanger (the high-pressure heat exchanger) 6 or the specific enthalpy of the refrigerant at the inlet to the indoor heat exchanger 6 is integrally determined by the outside air temperature $T_o$ and the rotational frequency $F_o$ of the outdoor fan 3, the inflow temperature of the refrigerant into the indoor heat exchanger 6 or the specific enthalpy of the refrigerant at the inlet to the indoor heat exchanger 6 may also be used instead of the outside air temperature $T_o$.

In the flowcharts that are shown in FIGS. 8 and 9, control target values are determined, and the rotational frequency of the compressor 1, the degree of opening of the electronic expansion valve 4, the rotational frequency of the outdoor fan 3, and the rotational frequency of the indoor fan 7, etc., are controlled to make the control parameters approach the control target values, but at least one of the rotational frequency of the compressor 1, the degree of opening of the electronic expansion valve 4, the rotational frequency of the outdoor fan 3, or the rotational frequency of the indoor fan 7 should be controlled.

In the flowcharts that are shown in FIGS. 8 and 9, the control target values are determined by estimating the thermal load, but a simple method for setting the control target values that does not need to take thermal load into account will now be shown.

Moreover, at or above the critical pressure, if control is performed such that a temperature difference $(T_d{}^* - T_i)$ with the indoor temperature $T_i$ is used as a target value based on the heating load as a control parameter instead of the dew point target value $T_d{}^*$ of the refrigerant at the outlet of the indoor heat exchanger 6, the temperature difference between the refrigerant and the indoor air can also be found appropriately if the indoor temperature $T_i$ has fluctuated, enabling operation in a state of high COP. In addition, as can be seen from the setting results of the control target values based on FIGS. 3 through 7, there is no problem if constant values are substituted for SH*, SC*, $T_d{}^*$, and $(T_d{}^* - T_i)$.

Figure 10:
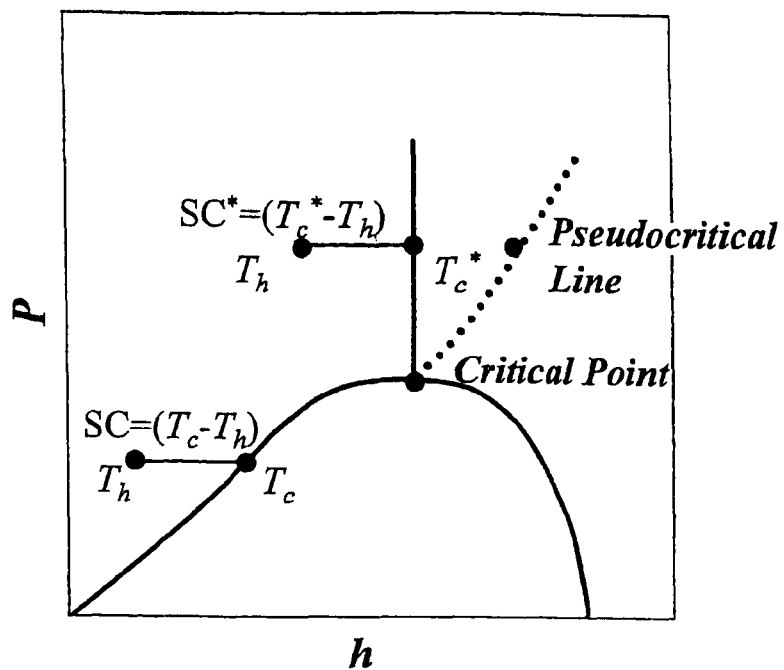
FIG. 10 is a chart that explains a defining method for supercooling SC according to Embodiment 1 of the present invention.

As shown in FIG. 10, if a temperature at which specific heat is greatest for a given pressure (a pseudocritical temperature) or a temperature that can be found from the specific enthalpy of the critical pressure and the given pressure, etc., is set nominally as a dummy condensing temperature $T_c{}'$ as a definition of a condensing temperature that is greater than or equal to the critical pressure, and control is performed such that a dummy supercooling SC' $(=T_c{}' - T_d)$ is a constant value, the temperature difference between the refrigerant and the indoor air can be found appropriately if the indoor temperature $T_i$ has fluctuated, also enabling operation in a state of high COP.

As for a target value for pressure, during cooling operation, control is performed based on a difference $(T_i - T_i{}^*)$ between the indoor temperature $T_i$ and a set indoor temperature $T_i{}^*$, and if $T_i - T_i{}^* > 0$, it is deemed that further cooling capacity is required, and the high-low pressure difference of the cycle is increased, and if $T_i - T_i{}^* < 0$, it is deemed that cooling capacity is excessive, and the high-low pressure difference of the cycle is reduced. Specifically, new control targets are set by calculating amounts of modification $\Delta P_H$ and $\Delta P_L$ for the high-pressure pressure target value $P_H{}^*$ and the low-pressure pressure target value $P_L{}^*$ based on the difference $(T_i - T_i{}^*)$ between the indoor temperature $T_i$ and a set indoor temperature $T_i{}^*$.

$$\Delta P_H = f_8(T_i - T_i{}^*)$$

$$\Delta P_L = f_9(T_i - T_i{}^*)$$

Moreover, relational expressions between the airflow rate $F_i$ of the fan of the indoor machine and the pressure target values ($P_L{}^*$ and $P_H{}^*$) should made in advance in this case, and control of the rotational frequency should be performed so as to match $P_L{}^*$ and $P_H{}^*$. Since the amount of electric input of the fan of the indoor machine is normally small compared to other elements and machinery, it may also simply be run at full speed.

Thus, according to Embodiment 1, the following effects can be achieved:

If the high-pressure pressure $P_H$ is less than the critical pressure (a threshold value), the high-pressure pressure target value $P_H{}^*$ is calculated based on the thermal load ($Q_c{}^*$ or $Q_h{}^*$) and the inflow temperature of the heated medium, and if the high-pressure pressure $P_H$ is greater than or equal to the critical pressure, the high-pressure pressure target value $P_H{}^*$ is calculated based on the thermal load, the inflow temperature of the heated medium, and the inflow temperature of the cooled medium.

Thus, if the high-pressure pressure is lower than the critical pressure when the control target values are set for reasons such as the thermal load being small, etc., the refrigerant mass flow rate through the refrigerating cycle will also be reduced, and the thermal resistance inside the high-pressure heat exchanger will be approximately equal in both the refrigerant and the heated medium. Because of this, even if the temperature or the flow rate of the cooled medium fluctuates and the quantities of state of the refrigerant that flows into the high-pressure heat exchanger change, a predetermined heat exchanging capacity can still be achieved since the refrigerant mass flow rate is increased without modifying the high-pressure pressure target value to reduce the thermal resistance of the refrigerant and raise the overall heat transfer rate, enabling operation in a state of high COP.

If, on the other hand, the high-pressure pressure is greater than or equal to the critical pressure when the control target values are set for reasons such as the thermal load being great, etc., the refrigerant mass flow rate through the refrigerating cycle will be great, and the thermal resistance of the heated medium will be the dominant thermal resistance inside the high-pressure heat exchanger. Because of this, even if the quantities of state of the refrigerant that flows into the high-pressure heat exchanger fluctuate, a predetermined heat exchanging capacity can still be achieved since the high-pressure pressure is adjusted to control the temperature difference between the refrigerant and the heated medium, enabling operation in a state of high COP.

The low-pressure pressure target value $P_L{}^*$ is calculated based on the thermal load and the inflow temperature of the cooled medium. Thus, because the flow condition of the refrigerant inside the low-pressure heat exchanger is a gas-liquid two-phase flow, the heat transfer characteristics of the refrigerant are better than those of the air. Because of this, even if the inflow temperature of the heated medium into the high-pressure heat exchanger fluctuates and the specific enthalpy of the refrigerant that flows into the high-pressure heat exchanger changes, a predetermined heat exchanging capacity can still be achieved since the low-pressure pressure target value is fixed and only the refrigerant mass flow rate is adjusted, enabling operation in a state of high COP.

If the high-pressure pressure is less than the critical pressure, a supercooling target value is set for the refrigerant at the high-pressure heat exchanger outlet, and the temperature difference between the condensing temperature in the high-pressure heat exchanger and the refrigerant temperature at the high-pressure heat exchanger outlet is controlled so as to match the supercooling target value. If, on the other hand, the high-pressure pressure greater than or equal to the critical pressure, a refrigerant temperature target value is set for the high-pressure heat exchanger outlet, and the refrigerant temperature at the high-pressure heat exchanger outlet is controlled so as to match the refrigerant temperature target value. Thus, the refrigerating cycle is stabilized by fixing the refrigerant state at the outlet of the high-pressure heat exchanger, and at the same time a temperature difference that corresponds to the thermal load and the characteristics of the heat exchanger can be set between the refrigerant and the heated medium in the high-pressure heat exchanger, enabling operation in a state of high COP.

If a temperature difference target value is set between the refrigerant temperature of the high-pressure heat exchanger outlet and the inflow temperature of the heated medium instead of making refrigerant temperature a control parameter, and the temperature difference between the refrigerant temperature of the outlet of the high-pressure heat exchanger and the inflow temperature of the heated medium is controlled so as to match the temperature difference target value, refrigerating cycle adjustment can be performed so as to respond to thermal load while also accounting for fluctuations in the inflow temperature of the heated medium, enabling operation in a state of high COP.

A superheating target value is set for the refrigerant at the low-pressure heat exchanger outlet, and superheating of the refrigerant at the low-pressure heat exchanger outlet is controlled so as to match the superheating target value. Thus, superheating in the low-pressure heat exchanger can be controlled appropriately, enabling operation in a state of high COP.

Embodiment 2

Figure 12:
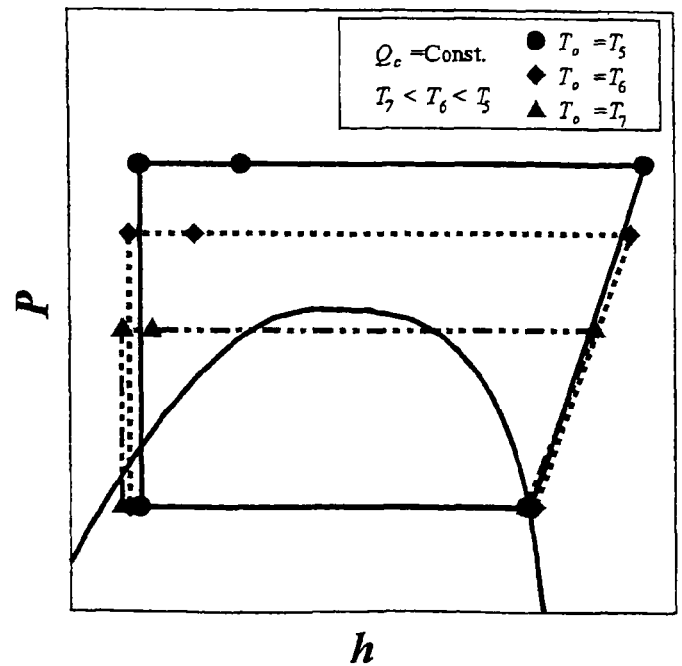
FIG. 12 is a pressure-specific enthalpy chart for a refrigerating cycle of the refrigerant circuit that is shown in FIG. 11 when ambient temperature fluctuates during cooling operation.
Figure 11:
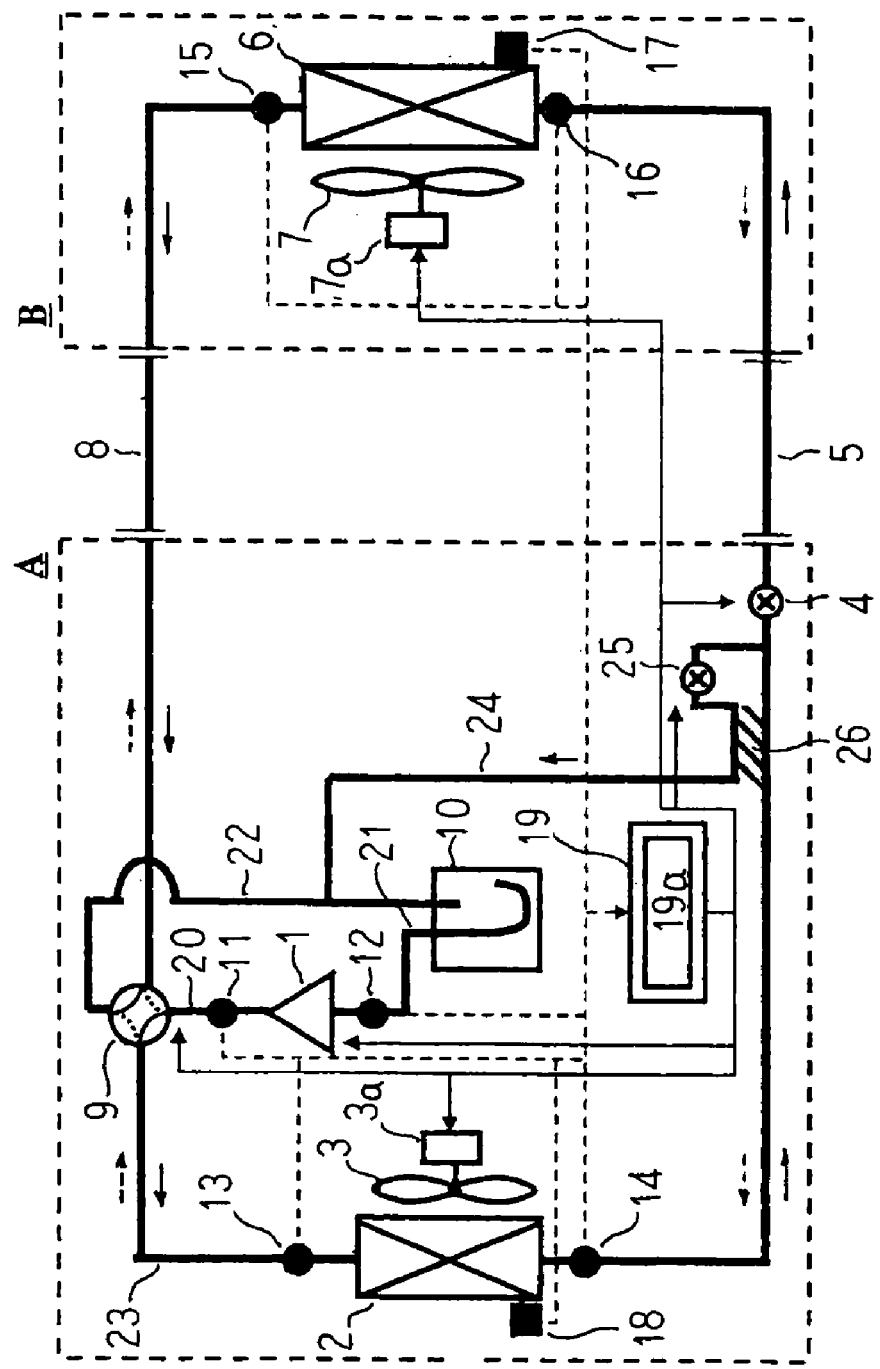
FIG. 11 is a refrigerant circuit diagram for an air conditioner according to Embodiment 2 of the present invention.

FIG. 11 is a refrigerant circuit diagram for an air conditioner according to Embodiment 2 of the present invention, and FIG. 12 is a pressure-specific enthalpy chart when ambient temperature fluctuates during cooling operation in the air conditioner according to Embodiment 2 of the present invention.

In FIG. 11, an air conditioner that functions as a refrigerating cycle apparatus includes: bypass piping 24 that communicates between liquid piping 5 on an outdoor heat exchanger 2 side of an electronic expansion valve 4 and an inflow pipe 22; an electronic expansion valve 25 that is disposed on the bypass piping 24; and an internal heat exchanger 26 that is disposed between the bypass piping 24 on an inflow pipe 22 side of the electronic expansion valve 25 and the liquid piping 5. Moreover, the rest of this embodiment is configured in a similar manner to Embodiment 1 above.

In an air conditioner that is configured in this manner, the electronic expansion valve 25 is fully closed during heating operation, and the air conditioner operates in a similar manner to Embodiment 1 above. During cooling operation, the air conditioner also operates in a similar manner to Embodiment 1 above except for the fact that a degree of opening of the electronic expansion valve 25 is adjusted such that a portion of the medium-temperature, high-pressure refrigerant gas that flows through the liquid piping 5 from the outdoor heat exchanger 2 is made to flow into the bypass piping 24 and exchange heat with the medium-temperature, high-pressure refrigerant gas that flows through the liquid piping 5 at the internal heat exchanger 26, and is then returned to the accumulator 10.

The air conditioner according to Embodiment 2 is also controlled by an operation control method that is similar to that of Embodiment 1 above, but since the refrigerant mass flow rate Gr through the liquid piping 5, the indoor heat exchanger 6, and the gas piping 8 can be reduced during cooling operation by controlling the superheating of the refrigerant at the outlet of the internal heat exchanger 26 so as to be is equal to the superheating SH in the indoor heat exchanger 6, pressure loss decreases, enabling operation in a state of high COP.

As shown in FIG. 12, one effect is that the specific enthalpy is reduced even more when the outside air temperature $T_o$ is high, enabling the specific enthalpy and the refrigerant mass flow rate Gr that flows into the indoor heat exchanger 6 to be adjusted so as to be approximately constant even if the outside air temperature $T_o$ fluctuates.

Moreover, in Embodiments 1 and 2 above, simple carbon dioxide is used for the refrigerant, but similar effects can also be achieved using a refrigerant that contains carbon dioxide as a major constituent, a fluorocarbon refrigerant, or a hydrocarbon refrigerant instead of simple carbon dioxide by setting a point at which heat conductance of the refrigerant is greater than the heat conductance of air even when the fan airflow rate of the high-pressure heat exchanger is maximized as a threshold value.

Embodiment 3

Figure 13:
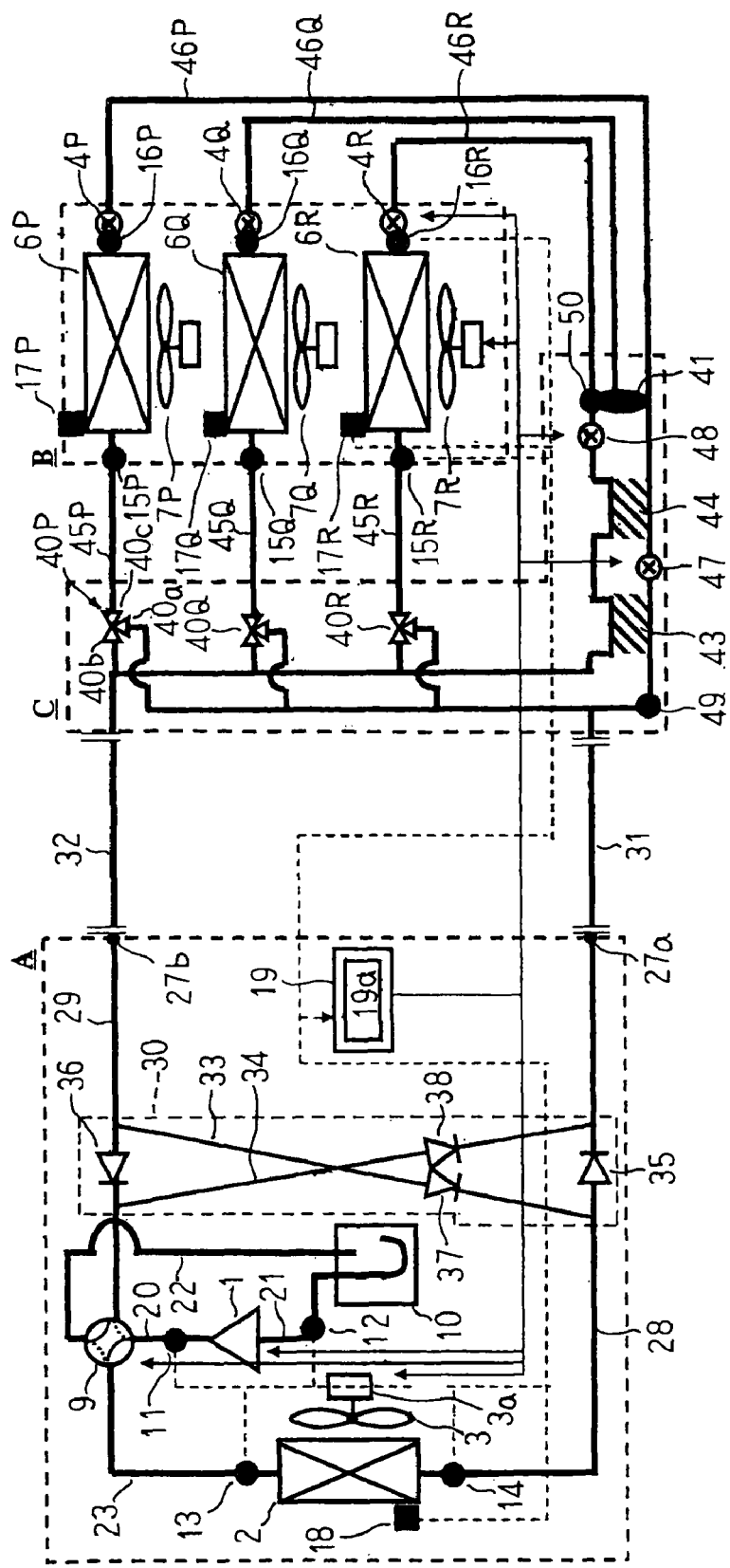
FIG. 13 is a refrigerant circuit diagram for an air conditioner according to Embodiment 3 of the present invention.

FIG. 13 is a refrigerant circuit diagram for an air conditioner according to Embodiment 3 of the present invention.

In FIG. 13, a two-pipe multi-room air conditioner that functions as a refrigerating cycle apparatus uses as a refrigerant a supercritical refrigerant such as simple carbon dioxide in which a high-pressure side is greater than or equal to a gas-liquid two-phase or critical pressure depending on thermal load conditions, etc. This multi-room air conditioner includes: an outdoor unit A; an indoor unit B that has three indoor machines; and a separation controller C that distributes the refrigerant to the indoor machines inside the indoor unit B.

The outdoor unit A has a compressor 1, an outdoor heat exchanger 2, an outdoor fan 3, an accumulator 10, and a flow channel switching portion 30, and these are disposed so as to communicate fluid between first and second connecting end portions 27a and 27b. A first end of compressor discharge piping 20 is connected to a refrigerant discharge outlet of the compressor 1, and a second end is connected to a four-way switching valve 9. A first end of compressor intake piping 21 is connected to a refrigerant intake inlet of the compressor 1, and a second end is connected to an upper portion of the accumulator 10. A first end of an inflow pipe 22 is connected to the four-way switching valve 9, and a second end is connected to an upper portion of the accumulator 10. A first end of the outdoor heat exchanger 2 is connected to the four-way switching valve 9 by means of piping 23, and a second end the outdoor heat exchanger 2 is connected to the first connecting end portion 27a by means of piping 28. The four-way switching valve 9 and the second connecting end portion 27b are connected by piping 29. The four-way switching valve 9 is configured such that the direction of the refrigerant that flows to the outdoor heat exchanger 2 can be switched so as to correspond to operating modes.

The flow channel switching portion 30 makes the refrigerant flow from the first connecting end portion 27a of the outdoor unit A to the separation controller C through high-pressure piping 31 that functions as liquid piping, and flow from the separation controller C to the second connecting end portion 27b of the outdoor unit A through low-pressure piping 32 that functions as gas piping, irrespective of the operating mode. A check valve 35 is disposed on the piping 28 to allow the refrigerant to flow only from the outdoor heat exchanger 2 toward the first connecting end portion 27a. A check valve 36 is also disposed on the piping 29 so as to allow the refrigerant to flow only from the second connecting end portion 27b toward the four-way switching valve 9. The flow channel switching portion 30 also includes bypass piping 33 that has a first end that is connected to a portion of the piping 28 on an outdoor heat exchanger 2 side of the check valve 35, and a second end that is connected to a portion of the piping 29 on a second connecting end portion 27b side of the check valve 36. A check valve 37 that allows the refrigerant to flow only from the second connecting end portion 27b toward the outdoor heat exchanger 2 is disposed on an intermediate portion of this bypass piping 33. In addition, the flow channel switching portion 30 includes bypass piping 34 that has a first end that is connected to a portion of the piping 28 on a first connecting end portion 27a side of the check valve 35, and a second end that is connected to a portion of the piping 29 on a four-way switching valve 9 side of the check valve 36. A check valve 38 that allows the refrigerant to flow only from the four-way switching valve 9 toward the first connecting end portion 27a is disposed on an intermediate portion of this bypass piping 34.

A discharge pressure detector 11 that detects a discharge pressure of the refrigerant is disposed on the compressor discharge piping 20, and an intake pressure detector 12 that detects an intake pressure of the refrigerant is disposed on the compressor intake piping 21. Refrigerant temperature detectors 13 and 14 are disposed on the piping 23 and 28 in a vicinity of ports to and from the heat exchanger 2. A high-pressure pressure detector 49 that detects a high-pressure pressure of the refrigerant is disposed on the high-pressure piping 31, and an intermediate pressure detector 50 that detects an intermediate pressure of the refrigerant is disposed on a medium-pressure merging portion 41.

The indoor unit B includes three indoor machines, specifically, indoor heat exchangers 6P, 6Q, and 6R; and indoor fans 7P, 7Q, and 7R that introduce indoor air to the respective indoor heat exchangers 6P, 6Q, and 6R.

The separation controller C includes three-way switching valves 40P, 40Q, and 40R that are equal in number to the indoor machines, that each have three connecting ports. A first end of the high-pressure piping 31 is connected to the first connecting end portion 27a, and a second end is connected to the medium-pressure merging portion 41. A first end of the low-pressure piping 32 is connected to the second connecting end portion 27b, and a second end is connected to the medium-pressure merging portion 41 through heat exchanging portions 43 and 44 that allow the refrigerant that flows through the low-pressure piping 32 and the refrigerant that flows through the high-pressure piping 31 to exchange heat with each other. In addition, the second end of the high-pressure piping 31 branches off and is connected to respective connecting ports 40a of the three-way switching valves 40P, 40Q, and 40R. The second end of the low-pressure piping 32 branches off and is connected to respective connecting ports 40b of the three-way switching valves 40P, 40Q, and 40R. Respective connecting ports 40c of the three-way switching valves 40P, 40Q, and 40R are connected to first ends of the indoor heat exchangers 6P, 6Q, and 6R by means of gas branch pipes 45P, 45Q, and 45R. In addition, second ends of the indoor heat exchangers 6P, 6Q, and 6R are respectively connected to the medium-pressure merging portion 41 by means of liquid branch pipes 46P, 46Q, and 46R. An electronic expansion valve 47 is disposed on a portion of the high-pressure piping 31 between the heat exchanging portions 43 and 44, and an electronic expansion valve 48 is disposed on a portion of the low-pressure piping 32 between the medium-pressure merging portion 41 and the heat exchanging portions 43 and 44.

Electronic expansion valves 4P, 4Q, and 4R that function as a throttling means are disposed on the liquid branch pipes 46P, 46Q, and 46R near the second ends of the respective indoor heat exchangers 6P, 6Q, and 6R. Refrigerant temperature detectors 15P, 15Q, and 15R and refrigerant temperature detectors 16P, 16Q, and 16R are disposed on the gas branch pipes 45P, 45Q, and 45R and the liquid branch pipes 46P, 46Q, and 46R in a vicinity of respective inlets and the outlets of the indoor heat exchangers 6P, 6Q, and 6R. In addition, indoor temperature detectors 17P, 17Q, and 17R are disposed in air near the respective indoor heat exchangers 6P, 6Q, and 6R.

Moreover, the rest of this embodiment is configured in a similar manner to Embodiment 1 above. In Embodiment 3, a case in which three indoor machines are connected to the indoor unit B is shown, but cooling and heating can be operated simultaneously by disposing two or more indoor machines.

Next, operation of an air conditioner that is configured in this manner will be explained.

First, a case in which only cooling loads $Q_c^*$ are present in the indoor machines will be explained. In this case, the four-way switching valve 9 is connected as indicated by the solid lines in FIG. 13 such that the compressor 1 and the outdoor heat exchanger 2 communicate, and the outdoor heat exchanger 2 functions as a radiator.

Low-temperature, low-pressure refrigerant gas in the accumulator 10 is sucked through the compressor intake piping 21 into the compressor 1, is compressed by the compressor 1, and is discharged as high-temperature, high-pressure refrigerant gas. The high-temperature, high-pressure refrigerant gas that has been introduced into the outdoor heat exchanger 2 then exchanges heat with the outdoor air that has been introduced into the outdoor heat exchanger 2 by the outdoor fan 3. The temperature of the carbon dioxide that functions as the refrigerant is reduced as it heats the outdoor air. The refrigerant gas, now at medium temperature and high pressure, flows through the piping 28 and the high-pressure piping 31 via the check valve 35 and is introduced into the separation controller C.

The medium-temperature, high-pressure refrigerant gas that flows through the high-pressure piping 31 then becomes medium-pressure gas at the electronic expansion valve 47, branches off from the medium-pressure merging portion 41 to the liquid branch pipes 46P, 46Q, and 46R, is decompressed by the electronic expansion valves 4P, 4Q, and 4R, and is introduced into the indoor heat exchangers 6P, 6Q, and 6R in a low-temperature, low-pressure, gas-liquid two-phase state. The low-temperature, low-pressure refrigerant in the gas-liquid two-phase state that has been introduced into the indoor heat exchangers 6P, 6Q, and 6R exchanges heat with the indoor air that has been introduced into the indoor heat exchangers 6P, 6Q, and 6R by the indoor fans 7P, 7Q, and 7R, and changes to a low-temperature, low-pressure refrigerant vapor while cooling the indoor air. The low-temperature, low-pressure refrigerant vapor then flows through the gas branch pipes 45P, 45Q, and 45R, the low-pressure piping 32, the piping 29, the check valve 36, the four-way switching valve 9, and the inflow pipe 22, and is returned to the accumulator 10. The refrigerant that has been returned to the accumulator 10 is separated into gas and liquid, and the low-temperature, low-pressure refrigerant gas is sucked through the compressor intake piping 21 into the compressor 1.

Next, a case in which cooling loads $Q_c^*$ and heating loads $Q_h^*$ are present but the cooling loads $Q_c^*$ are greater will be explained. Here, let us assume that only the indoor heat exchanger 6P is in heating operation, and the indoor heat exchangers 6Q and 6R are in cooling operation.

First, low-temperature, low-pressure refrigerant gas in the accumulator 10 is sucked through the compressor intake piping 21 into the compressor 1, is compressed by the compressor 1, and is discharged as high-temperature, high-pressure refrigerant gas. The high-temperature, high-pressure refrigerant gas that has been introduced into the outdoor heat exchanger 2 then exchanges heat with the outdoor air that has been introduced into the outdoor heat exchanger 2 by the outdoor fan 3. The temperature of the carbon dioxide that functions as the refrigerant is reduced without condensing as it heats the outdoor air. The refrigerant gas, now at medium temperature and high pressure, flows through the piping 28 and the high-pressure piping 31 via the check valve 35 and is introduced into the separation controller C.

Here, the three-way switching valve 40P is controlled such that the indoor heat exchanger 6P that is in heating operation communicates with the high-pressure piping 31. The three-way switching valves 40Q and 40R are controlled such that the indoor heat exchangers 6Q and 6R that are in cooling operation communicate with the low-pressure piping 32. The electronic expansion valve 47 is fully closed, and the electronic expansion valve 48 is at a predetermined degree of opening. Moreover, the intermediate pressure can be kept constant if control is performed such that a predetermined target value for the electronic expansion valve 48 is set to the intermediate pressure, and the degree of opening of the electronic expansion valve 48 is reduced if the detected value from the intermediate pressure detector 50 is lower than the target value, and the degree of opening of the electronic expansion valve 48 is increased if the detected value from the intermediate pressure detector 50 is higher than the target value, increasing cycle control stability.

Thus, all of the medium-temperature, high-pressure refrigerant gas that flows through the high-pressure piping 31 is introduced into the indoor heat exchanger 6P through the gas branch pipe 45P, exchanges heat with the indoor air, then becomes medium-pressure gas at the electronic expansion valve 4P, and reaches the medium-pressure merging portion 41 through the liquid branch pipe 46P. The medium-pressure refrigerant gas then flows through the liquid branch pipes 46Q and 46R, is decompressed at the electronic expansion valves 4Q and 4R, and is introduced into the indoor heat exchangers 6Q and 6R in a low-temperature, low-pressure, gas-liquid two-phase state. The low-temperature, low-pressure refrigerant in the gas-liquid two-phase state that has been introduced into the indoor heat exchangers 6Q and 6R exchanges heat with the indoor air that has been introduced into the indoor heat exchangers 6Q and 6R by the indoor fans 7Q and 7R, and changes to a low-temperature, low-pressure refrigerant vapor while cooling the indoor air. The low-temperature, low-pressure refrigerant vapor then flows out through the gas branch pipes 45Q and 45R into the low-pressure piping 32.

The low-temperature, low-pressure refrigerant vapor then flows through the low-pressure piping 32, the piping 29, the check valve 36, the four-way switching valve 9, and the inflow pipe 22, and is returned to the accumulator 10. The refrigerant that has been returned to the accumulator 10 is separated into gas and liquid, and the low-temperature, low-pressure refrigerant gas is sucked through the compressor intake piping 21 into the compressor 1.

Since the medium-temperature, high-pressure gas that has been introduced from the outdoor heat exchanger 2 through the piping 28 into the high-pressure piping 31 in this manner is in a supercritical state, the amount of increase in pressure loss that accompanies flow rate increases is less than if it were a gas-liquid two-phase flow. Thus, the heat exchanging performance of the indoor heat exchangers is improved more, and the effects of pressure loss suppressed, if all of the refrigerant is introduced into the indoor heat exchanger 6P that performs heating than if the medium-temperature, medium-pressure gas were made to flow through the electronic expansion valve 47 into the medium-pressure merging portion 41, enabling operation in a state of high COP.

If it appears likely that noise or piping vibration, etc., may arise together with the increase in refrigerant mass flow rate Gr into the indoor heat exchanger 6P that performs heating, limits may be disposed such as a flow rate limit, an upper limit on pressure loss, etc., and a portion of the medium-temperature, high-pressure gas that has been introduced into the high-pressure piping 31 may be passed through the electronic expansion valve 47 and then merged with the refrigerant that has flowed in through the indoor heat exchanger 6P before being made to flow into the indoor heat exchangers 6Q and 6R. Thus, reliability of the air conditioner can be improved while maintaining COP in as high a state as possible.

Next, a case in which only heating loads $Q_h^*$ are present in the indoor machines will be explained. In this case, the four-way switching valve 9 is connected as indicated by the dotted lines in FIG. 13 such that the compressor 1 and the high-pressure piping 31 communicate, the outdoor heat exchanger 2 and the accumulator 10 communicate, and the outdoor heat exchanger 2 functions as an evaporator.

First, low-temperature, low-pressure refrigerant gas in the accumulator 10 is sucked through the compressor intake piping 21 into the compressor 1, is compressed by the compressor 1, and is discharged as high-temperature, high-pressure refrigerant gas. The high-temperature, high-pressure refrigerant gas flows through the check valve 38 of the bypass piping 34, through the piping 28 and into the high-pressure piping 31, and is introduced into the separation controller C.

The high-temperature, high-pressure refrigerant gas that has been introduced into the separation controller C passes from the three-way switching valves 40P, 40Q, and 40R through the gas branch pipes 45P, 45Q, and 45R, is introduced into the indoor heat exchangers 6P, 6Q, and 6R, exchanges heat with the indoor air, then becomes a medium-pressure gas at the electronic expansion valves 4P, 4Q, and 4R, and reaches the medium-pressure merging portion 41 through the liquid branch pipes 46P, 46Q, and 46R. Then, the medium-pressure refrigerant gas flows through the electronic expansion valve 48 and the low-pressure piping 32, flows into the piping 29 from the second connecting end portion 27b, passes through the check valve 37 of the bypass piping 33, and is introduced into the outdoor heat exchanger 2 through the piping 28. The refrigerant exchanges heat with the outdoor air, then flows through the piping 23, the four-way switching valve 9, and the inflow pipe 22, and is returned to the accumulator 10. The refrigerant that has been returned to the accumulator 10 is separated into gas and liquid, and the low-temperature, low-pressure refrigerant gas is sucked through the compressor intake piping 21 into the compressor 1.

Next, a case in which cooling loads $Q_c^*$ and heating loads $Q_h^*$ are present but the heating loads $Q_h^*$ are greater will be explained. Here, let us assume that only the indoor heat exchanger 6P is in cooling operation, and the indoor heat exchangers 6Q and 6R are in heating operation.

First, low-temperature, low-pressure refrigerant gas in the accumulator 10 is sucked through the compressor intake piping 21 into the compressor 1, is compressed by the compressor 1, and is discharged as high-temperature, high-pressure refrigerant gas. The high-temperature, high-pressure refrigerant gas flows through the check valve 38 of the bypass piping 34, through the piping 28 and into the high-pressure piping 31, and is introduced into the separation controller C.

Here, the three-way switching valve 40P is controlled such that the indoor heat exchanger 6P that is in cooling operation communicates with the low-pressure piping 32. The three-way switching valves 40Q and 40R are controlled such that the indoor heat exchangers 6Q and 6R that are in heating operation communicate with the high-pressure piping 31. The electronic expansion valve 47 is fully closed, and the electronic expansion valve 48 is at a predetermined degree of opening. Moreover, the intermediate pressure can be kept constant if control is performed such that a predetermined target value for the electronic expansion valve 48 is set to the intermediate pressure, and the degree of opening of the electronic expansion valve 48 is reduced if the detected value from the intermediate pressure detector 50 is lower than the target value, and the degree of opening of the electronic expansion valve 48 is increased if the detected value from the intermediate pressure detector 50 is higher than the target value, increasing cycle control stability.

The high-temperature, high-pressure refrigerant gas that has been introduced into the separation controller C passes from the three-way switching valves 40Q and 40R through the gas branch pipes 45Q and 45R, is introduced into the indoor heat exchangers 6Q and 6R, exchanges heat with the indoor air, then becomes a medium-pressure gas at the electronic expansion valves 4Q and 4R, and reaches the medium-pressure merging portion 41 through the liquid branch pipes 46Q and 46R. A portion of the medium-pressure refrigerant gas then flows through the liquid branch pipe 46P, is decompressed at the electronic expansion valve 4P, and is introduced into the indoor heat exchanger 6P in a low-temperature, low-pressure, gas-liquid two-phase state. The low-temperature, low-pressure refrigerant in the gas-liquid two-phase state that has been introduced into the indoor heat exchanger 6P exchanges heat with the indoor air that has been introduced into the indoor heat exchanger 6P by the indoor fan 7P, and changes to a low-temperature, low-pressure refrigerant vapor while cooling the indoor air. The low-temperature, low-pressure refrigerant vapor then flows out through the gas branch pipe 45P into the low-pressure piping 32.

Remaining medium-pressure refrigerant gas, which flowed through the liquid branch pipes 46Q and 46R into the medium-pressure merging portion 41, passes through the electronic expansion valve 48, flows into the low-pressure piping 32, and merges with the refrigerant that flowed out through the gas branch pipe 45P into the low-pressure piping 32. The refrigerant then flows into the piping 29 from the second connecting end portion 27b, passes through the check valve 37 of the bypass piping 33, is introduced into the outdoor heat exchanger 2 through the piping 28, exchanges heat with the outdoor air, then flows through the piping 23, the four-way switching valve 9, and the inflow pipe 22, and is returned to the accumulator 10. The refrigerant that has been returned to the accumulator 10 is separated into gas and liquid, and the low-temperature, low-pressure refrigerant gas is sucked through the compressor intake piping 21 into the compressor 1.

Now, since the refrigerant in the indoor heat exchanger 6P that is in cooling operation is a gas-liquid two-phase flow, pressure loss is increased by increases in the refrigerant mass flow rate Gr. Thus, in order to maintain heat exchanging performance while suppressing pressure loss in the indoor heat exchanger 6P, the flow rate of the medium-pressure refrigerant gas that is introduced into the indoor heat exchanger 6P is controlled so as to have constant superheating SH at the outlet of the indoor heat exchanger 6P, and remaining medium-pressure refrigerant gas is made to flow through the electronic expansion valve 48 into the low-pressure piping 32.

By performing setting of pressure and temperature target values in a similar manner to the operation control methods for cooling and heating that are explained in Embodiment 1 above, the air conditioner operation control method according to Embodiment 3 can achieve operation in a state of high COP even if the cooling load $Q_c^*$, the heating load $Q_h^*$, or the outside air temperature $T_o$ change.

Since the refrigerant that passes through the high-pressure piping 31 exchanges heat with the refrigerant that has been decompressed and lowered in temperature by passing through the electronic expansion valve 48, the heat exchanging portions 43 and 44 effectively lower temperature of the refrigerant that flows into the medium-pressure merging portion 41, having similar effects to those of the internal heat exchanger 26 in Embodiment 2.

When indoor heat exchangers that are in cooling operation and indoor heat exchangers that are in heating operation are both present, waste heat that is taken from positions that require cold can be used in positions that require warmth, increasing COP.

When the cooling loads are more numerous than the heating loads, since the high-pressure side is a single-phase flow in a supercritical state and the pressure loss per unit mass flow rate of the carbon dioxide refrigerant is less than that of a fluorocarbon refrigerant, increases in heat exchange characteristics can be achieved while suppressing increases in pressure loss by making all of the refrigerant in the circuit flow into the indoor heat exchangers that are in heating operation, enabling operation in a state of high COP. Here, in preparation for cases such as piping vibration and refrigerant noise arising when the total flow rate of the refrigerant is great and all of the refrigerant is made to flow in, by disposing an upper limit on a refrigerant pressure difference upstream and downstream from a indoor heat exchanger that is in heating operation, such as on the difference between the measured value of the high-pressure pressure detector 49 and the measured value of the intermediate pressure detector 50, for example, and controlling the electronic expansion valve 47 so as to make the refrigerant bypass if the pressure difference exceeds the upper limit until it is less than or equal to the upper limit, piping vibration and refrigerant noise that results from increases in the refrigerant flow rate through the heat exchanger that is in heating operation can be suppressed.

If the heating loads are more numerous than the cooling loads, the low-pressure side is a gas-liquid two-phase flow, and pressure loss increases greatly together with increases in the flow rate. Thus, reductions in COP due to increases in pressure loss can be suppressed by making all of the refrigerant in the circuit flow into indoor heat exchangers that are in heating operation, performing flow control on inflow rate of the refrigerant that flows out of the indoor heat exchangers that are in heating operation into the indoor heat exchangers that are in cooling operation in response to thermal load by controlling superheating at the outlet, and making remaining refrigerant bypass through the electronic expansion valve 48.

Moreover, in Embodiment 3 above, simple carbon dioxide was used for the refrigerant, but any refrigerant in which the high-pressure side is in a supercritical state during operation such as a refrigerant that contains carbon dioxide as a major constituent, etc., may also be used.

What is claimed is:

1. A refrigerating cycle apparatus operation control method for a refrigerating cycle apparatus comprising:
    a refrigerant circuit that is configured by connecting a compressor, a high-pressure heat exchanger, a throttling means, and a low-pressure heat exchanger using liquid piping and gas piping, and through which a refrigerant is cycled;
    a heated medium conveying means and a cooled medium conveying means that convey a heated medium and a cooled medium relative to said high-pressure heat exchanger and said low-pressure heat exchanger;

a detecting means that detects temperature and pressure of said refrigerant in said refrigerant circuit and temperatures of said heated medium and said cooled medium; and a controlling means that sets a high-pressure pressure target value from thermal load and temperature conditions that are based on refrigerant information that has been obtained from said detecting means, and controls at least one of a rotational frequency of said compressor, a degree of opening of said throttling means, a flow rate of said heated medium, or a flow rate of said cooled medium so as to match a high-pressure pressure to said high-pressure pressure target value that has been set, wherein said controlling means sets a threshold value when said high-pressure pressure target value is set, and modifies a method for setting said high-pressure pressure target value depending on whether said high-pressure pressure is greater than or equal to said threshold value or less than said threshold value when said high-pressure pressure target value is decided.

2. A refrigerating cycle apparatus operation control method according to claim 1, wherein:

said high-pressure pressure target value is calculated based on said thermal load and an inflow temperature of said heated medium if said high-pressure pressure is less than said threshold value when said high-pressure pressure target value is set; and said high-pressure pressure target value is calculated based on said thermal load, an inflow temperature of said heated medium, and an inflow temperature of said cooled medium if said high-pressure pressure is greater than or equal to said threshold value when said high-pressure pressure target value is set.

3. A refrigerating cycle apparatus operation control method according to claim 1, wherein said refrigerant is a refrigerant in which said high-pressure pressure exceeds a critical pressure, and said threshold value is set to said critical pressure.

4. A refrigerating cycle apparatus operation control method according to claim 1, wherein said controlling means sets a low-pressure pressure target value in said low-pressure heat exchanger from said thermal load and an inflow temperature of said cooled medium, and controls at least one of a rotational frequency of said compressor, a degree of opening of said throttling means, a flow rate of said heated medium, or a flow rate of said cooled medium such that a low-pressure pressure matches said low-pressure pressure target value that has been set.

5. A refrigerating cycle apparatus operation control method according to claim 1, wherein said controlling means sets a superheating target value for said refrigerant at a low-pressure heat exchanger outlet, and controls at least one of a rotational frequency of said compressor, a degree of opening of said throttling means, a flow rate of said heated medium, or a flow rate of said cooled medium so as to match superheating of said refrigerant at said low-pressure heat exchanger outlet to said superheating target value.

6. A refrigerating cycle apparatus operation control method according to claim 1, wherein said refrigerating cycle apparatus is a dual-pipe multi-room air conditioner that uses a refrigerant in which a high-pressure side is in a supercritical state, said refrigerating cycle apparatus comprising:

a single outdoor unit that comprises:

an outdoor heat exchanger that is disposed so as to communicate fluid between first and second connecting end portions;

an outdoor fan that conveys outdoor air to said outdoor heat exchanger; and said compressor;

said gas piping and said liquid piping, first ends of which are respectively connected said first and second connecting end portions;

a plurality of indoor units that each comprise:

an indoor heat exchanger that is disposed so as to communicate fluid between second ends of said gas piping and said liquid piping;

an indoor fan that conveys indoor air to said indoor heat exchanger; and said throttling means;

said detecting means that detects refrigerant temperatures upstream and downstream from said outdoor heat exchanger and said indoor heat exchangers, outdoor air temperature at said outdoor unit, indoor air temperatures at said indoor units, and refrigerant pressures upstream and downstream from said compressor; and said controlling means;

said refrigerating cycle apparatus having operating modes in which all of said plurality of indoor units are in cooling operation or in heating operation simultaneously, and operating modes in which said indoor units that are in cooling operation and said indoor units that are in heating operation coexist, such that:

in an operating mode in which all of said plurality of indoor units are in cooling operation simultaneously, said outdoor heat exchanger functions as said high-pressure heat exchanger, said outdoor air functions as said heated medium, said outdoor fan functions as said heated medium conveying means, and said indoor heat exchangers function as said low-pressure heat exchanger, said indoor air functions as said cooled medium, and said indoor fans function as said cooled medium conveying means;

in an operating mode in which all of said plurality of indoor units are in heating operation simultaneously, said outdoor heat exchanger functions as said low-pressure heat exchanger, said outdoor air functions as said cooled medium, said outdoor fan functions as said cooled medium conveying means, and said indoor heat exchangers function as said high-pressure heat exchanger, said indoor air functions as said heated medium, and said indoor fans function as said heated medium conveying means;

in an operating mode in which a cooling load is greater than a heating load, said outdoor heat exchanger and said indoor heat exchanger of said indoor unit that is in heating operation function as said high-pressure heat exchanger, said outdoor air and said indoor air at said indoor unit that is in heating operation function as said heated medium, said outdoor fan and said indoor fan of said indoor unit that is in heating operation function as said heated medium conveying means, and said indoor heat exchanger of said indoor unit that is in cooling operation functions as said low-pressure heat exchanger, said indoor air at said indoor unit that is in cooling operation functions as said cooled medium, and said indoor fan of said indoor unit that is in cooling operation functions as said cooled medium conveying means; and in an operating mode in which a heating load is greater than a cooling load, said indoor heat exchanger of said indoor unit that is in heating operation functions as said high-pressure heat exchanger, said indoor air at said indoor unit that is in heating operation functions as said heated medium, said indoor fan of said indoor unit that is in heating operation functions as said heated medium conveying means, and said outdoor heat exchanger and said indoor heat exchanger of said indoor unit that is in cooling operation function as said low-pressure heat exchanger, said outdoor air and said indoor air at said indoor unit that is in cooling operation function as said cooled medium, and said outdoor fan and said indoor fan of said indoor unit that is in cooling operation function as said cooled medium conveying means.

7. A refrigerating cycle apparatus operation control method according to claim 6, wherein:

in an operating mode in which a cooling load is greater than a heating load, all of said refrigerant that has been compressed by said compressor and has flowed through said outdoor heat exchanger is made to flow into said indoor heat exchanger of said indoor unit that is in heating operation, and then made to flow into said indoor heat exchanger of said indoor unit that is in cooling operation; and in an operating mode in which a heating load is greater than a cooling load, all of said refrigerant that has been compressed by said compressor is made to flow into said indoor heat exchanger of said indoor unit that is in heating operation, and a portion of said refrigerant that has flowed out of said indoor heat exchanger of said indoor unit that is in heating operation is made to flow into said indoor heat exchanger of said indoor unit that is in cooling operation, and a remaining portion of said refrigerant that has flowed out of said indoor heat exchanger of said indoor unit that is in heating operation is made to flow into said outdoor heat exchanger together with said refrigerant that has flowed out of said indoor heat exchanger of said indoor unit that is in cooling operation.

8. A refrigerating cycle apparatus operation control method according to claim 6, wherein in an operating mode in which a cooling load is greater than a heating load, a refrigerant pressure difference upstream and downstream from said indoor heat exchanger of said indoor unit that is in heating operation is controlled so as to be less than or equal to a predetermined value.

9. A refrigerating cycle apparatus operation control method, for a refrigerating cycle apparatus comprising:

a refrigerant circuit that is configured by connecting a compressor, a high-pressure heat exchanger, a throttling means, and a low-pressure heat exchanger using liquid piping and gas piping, and through which a refrigerant is cycled;

a heated medium conveying means and a cooled medium conveying means that convey a heated medium and a cooled medium relative to said high-pressure heat exchanger and said low-pressure heat exchanger;

a detecting means that detects temperature and pressure of said refrigerant in said refrigerant circuit and temperatures of said heated medium and said cooled medium; and a controlling means that sets a high-pressure pressure target value from thermal load and temperature conditions that are based on refrigerant information that has been obtained from said detecting means, and controls at least one of a rotational frequency of said compressor, a degree of opening of said throttling means, a flow rate of said heated medium, or a flow rate of said cooled medium so as to match a high-pressure pressure to said high-pressure pressure target value that has been set, wherein said controlling means sets a threshold value when said high-pressure pressure target value is set; and said controlling means sets a supercooling target value for said refrigerant at a high-pressure pressure heat exchanger outlet if said high-pressure pressure is less than said threshold value when said high-pressure pressure target value is decided, and sets a refrigerant temperature target value for said high-pressure heat exchanger outlet if said high-pressure pressure is greater than or equal to said threshold value when said high-pressure pressure target value is decided, and controls at least one of a rotational frequency of said compressor, a degree of opening of said throttling means, a flow rate of said heated medium, or a flow rate of said cooled medium such that a temperature difference between a condensing temperature in said high-pressure heat exchanger and a refrigerant temperature at said high-pressure heat exchanger outlet matches said supercooling target value, or a refrigerant temperature at said high-pressure heat exchanger outlet matches said refrigerant temperature target value.

10. A refrigerating cycle apparatus operation control method according to claim 9, wherein a target value is set for a temperature difference between a refrigerant temperature at said high-pressure heat exchanger outlet and an inflow temperature of said heated medium, and at least one of a rotational frequency of said compressor, a degree of opening of said throttling means, a flow rate of said heated medium, or a flow rate of said cooled medium is controlled so as to match said temperature difference between said refrigerant temperature at said high-pressure heat exchanger outlet and said inflow temperature of said heated medium to said target value.

* * * * *